US012058428B2

(12) United States Patent
Kang et al.

(10) Patent No.: US 12,058,428 B2
(45) Date of Patent: Aug. 6, 2024

(54) FLASH LENS OF ELECTRONIC DEVICE

(71) Applicant: Samsung Electronics Co., Ltd., Gyeonggi-do (KR)

(72) Inventors: Taeuk Kang, Gyeonggi-do (KR); Jiwoo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 17/539,360

(22) Filed: Dec. 1, 2021

(65) Prior Publication Data

US 2022/0217252 A1 Jul. 7, 2022

Related U.S. Application Data

(63) Continuation of application No. PCT/KR2021/017060, filed on Nov. 19, 2021.

(30) Foreign Application Priority Data

Jan. 7, 2021 (KR) ........................ 10-2021-0001895

(51) Int. Cl.
*H04N 23/55* (2023.01)
*G02B 19/00* (2006.01)
(Continued)

(52) U.S. Cl.
CPC ......... *H04N 23/55* (2023.01); *G02B 19/0061* (2013.01); *H04N 23/45* (2023.01); *H04N 23/56* (2023.01)

(58) Field of Classification Search
None
See application file for complete search history.

(56) References Cited

U.S. PATENT DOCUMENTS 10,120,266 B2 * 11/2018 Butterworth ............ H01L 33/58
10,408,426 B2 * 9/2019 Wyatt .................. G02B 6/0026
(Continued)

FOREIGN PATENT DOCUMENTS

JP         2013-101299 A     5/2013
KR   10-2016-0074362 A     6/2016
(Continued)

OTHER PUBLICATIONS

Shin Sung Hun; KR10-2016-0146130; "Camera Flash Module for Mobile Phone Having Light Uniform Filter"; Dec. 21, 2016; English Translation; pp. 1-4 (Year: 2016).*

(Continued)

*Primary Examiner* — Cynthia Segura
(74) *Attorney, Agent, or Firm* — Cha & Reiter, LLC

(57) ABSTRACT

An electronic device according to an embodiment may include a first camera module, and a flash module disposed adjacent to the first camera module, where the flash module may include an LED configured to emit light, and an optical lens disposed in the traveling direction of the light emitted from the LED. The optical lens may include a first surface in the direction facing the LED and a second surface in the direction opposite the first surface, and the second surface of the optical lens may include a first translucent area including a central area where the light emitted from the LED is incident and a second translucent area spaced apart from the first translucent area. Various other embodiments may be also provided.

20 Claims, 25 Drawing Sheets

(51) Int. Cl.
*H04N 23/45* (2023.01)
*H04N 23/56* (2023.01)

(56) References Cited

U.S. PATENT DOCUMENTS

| | | | |
|---|---|---|---|
| 10,809,596 B2 | 10/2020 | Choi et al. | |
| 2004/0201987 A1 | 10/2004 | Omata | |
| 2005/0253923 A1 | 11/2005 | Komori et al. | |
| 2015/0341533 A1* | 11/2015 | Yoshida | H04N 23/56 348/207.1 |
| 2016/0349598 A1 | 12/2016 | Chern et al. | |
| 2017/0082823 A1* | 3/2017 | Hwang | H04N 23/75 |
| 2020/0217482 A1* | 7/2020 | Yu | G02B 27/0955 |
| 2020/0396359 A1 | 12/2020 | Rosen et al. | |
| 2021/0311234 A1* | 10/2021 | Engelen | G07D 7/1205 |
| 2022/0054027 A1* | 2/2022 | Toda | A61B 5/026 |
| 2022/0196472 A1* | 6/2022 | Siess | G01N 21/255 |

FOREIGN PATENT DOCUMENTS

| | | |
|---|---|---|
| KR | 10-2016-0104886 A | 9/2016 |
| KR | 10-2016-0107238 A | 9/2016 |
| KR | 10-2016-0146130 A | 12/2016 |
| KR | 10-2018-0005450 A | 1/2018 |
| KR | 10-2150827 B1 | 8/2020 |
| WO | 2017/200341 A2 | 11/2017 |

OTHER PUBLICATIONS

Jeong Jang Hoon; KR10-2018-0005450; "Flash Module, Camera Module and Mobile Device Including the Same"; Jan. 16, 2018; English Translation; pp. 1-18 (Year: 2018).*
Written Opinion dated Feb. 25, 2022.
Extended European Search Report dated Mar. 22, 2024.

* cited by examiner

FLASH LENS OF ELECTRONIC DEVICE

CROSS-REFERENCE TO RELATED APPLICATION(S)

This application is a continuation of International Application No. PCT/KR2021/017060, filed on Nov. 19, 2021, which claims priority to Korean Patent Application No. 10-2021-0001895, filed on Jan. 7, 2021 in the Korean Intellectual Property Office, the disclosures of which are herein incorporated by reference.

TECHNICAL FIELD

One or more embodiments of the instant disclosure generally relates to an electronic device, for example, a flash lens of an electronic device.

BACKGROUND ART

As information and communication technologies have developed, semiconductor technology, and various electronic devices provide various functions have also developed. For example, the various functions may include functions related to voice calls, messages, broadcasts, the wireless Internet, cameras, and/or the reproduction of music.

An electronic device having a camera embedded therein is a recent trend, and interest in various methods for taking high-quality pictures at night or when there is insufficient light is also increasing.

SUMMARY

The electronic device may obtain images using at least one camera included in the electronic device, based on user inputs related to photography. In this case, an LED flash disposed inside the electronic device may be used. The flash may emit light at a specific angle, and the light, reflected from a subject whose image is to be captured, may pass through an optical lens to reach a subject.

According to the prior art, the emission angle of effective flash light of the electronic device is 76 degrees, and the flash may not be able to cover the field of view of the cameras. The electronic device may have a standard field of view (fov) of 79 degrees and a wide angle of view (fov) of 120 degrees.

In addition, according to the prior art, captured images may exhibit vignetting. Vignetting refers to when the peripheral portion of the image is darker than the central portion thereof. This is due to the fact that the subject is close to the flash, while the peripheral portion is far from the flash. Since the subject is located in the center of the light emitted from the flash, the subject may receive a relatively large amount of light, thereby causing glare. The peripheral portion receiving a relatively small amount of light from the flash may appear to be cave-like. Here, cave-like refers to a phenomenon where the background appears dark. This may be particularly problematic in cameras of mobile devices.

Certain embodiments of the disclosure provide a flash lens for preventing glare on a subject and improve the difference in brightness in the peripheral portion by evenly flashing the light emitted from the flash when capturing images in the dark, and a method of manufacturing the same.

An electronic device according to an embodiment may include a first camera module, and a flash module disposed adjacent to the first camera module, wherein the flash module may include an LED configured to emit light, and an optical lens disposed in the traveling direction of the light emitted from the LED, wherein the optical lens may include a first surface in the direction facing the LED and a second surface in the direction opposite the first surface, and wherein the second surface of the optical lens may include a first translucent area including a central area where the light emitted from the LED is incident and a second translucent area spaced apart from the first translucent area.

According to certain embodiments of the disclosure, an optical lens having different transparencies between the areas thereof may be provided in front of a light-emitting element of the electronic device, thereby providing a similar uniformity of light reaching a nearby subject or a background behind the same. According to this, it is possible to provide a flash lens that prevents glare of a nearby subject and prevents the background from darkening by causing the emitted light to evenly reach the subject when taking a picture.

DETAILED DESCRIPTION

Figure 1:
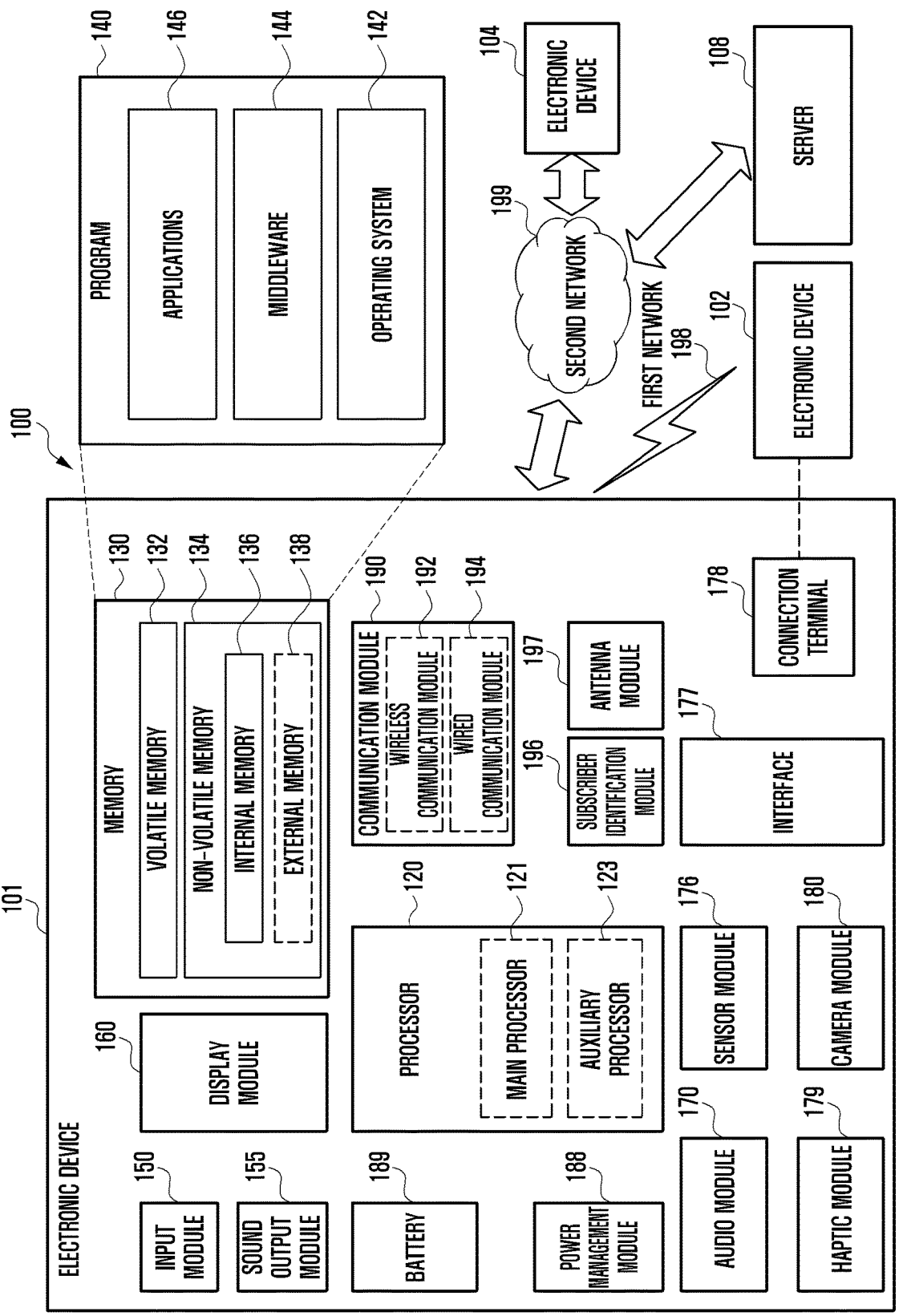
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
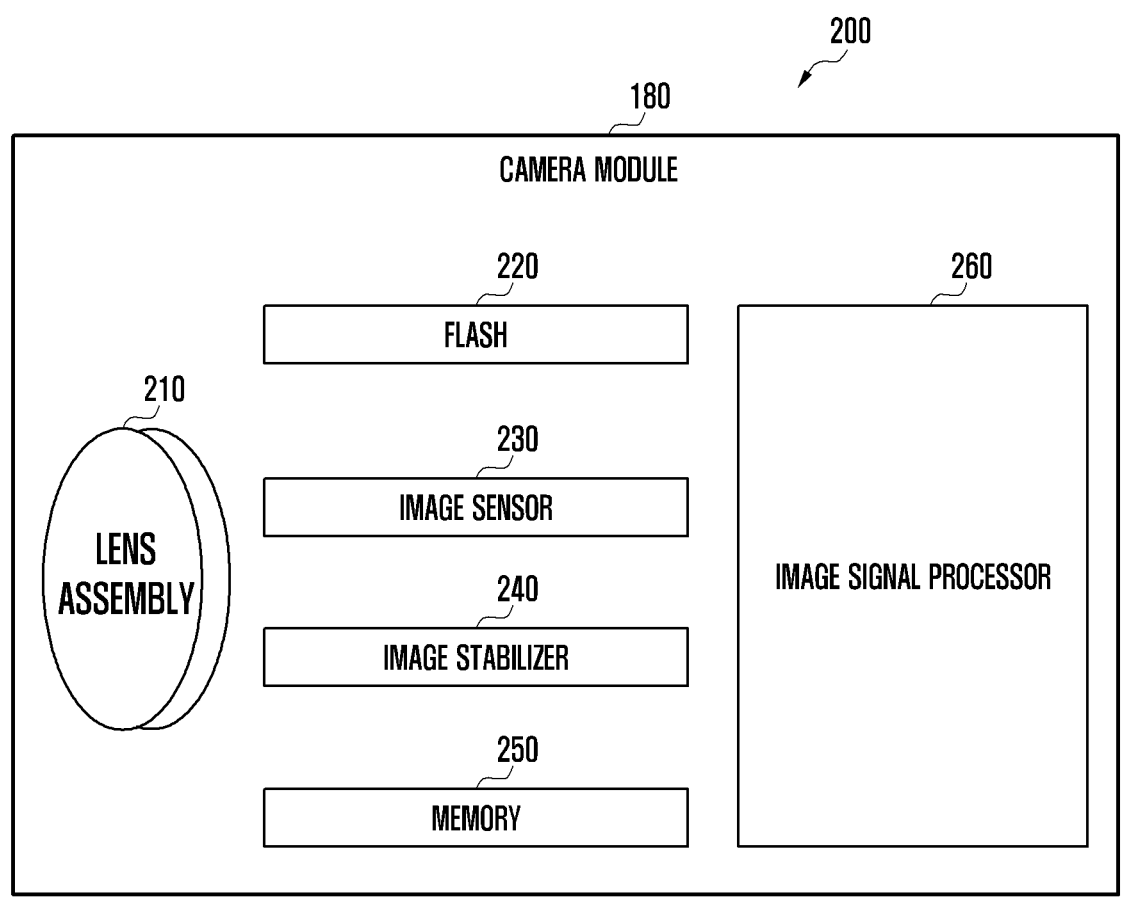
FIG. 2 is a block diagram 200 illustrating a camera module 180 according to an embodiment.

FIG. 2 is a block diagram 200 illustrating a camera module 180 according to an embodiment. Referring to FIG. 2, the camera module 180 may include a lens assembly 210, a flash 220, an image sensor 230, an image stabilizer 240, a memory 250 (e.g., a buffer memory), or an image signal processor 260. The lens assembly 210 may collect light emitted from a subject to be captured as an image. The lens assembly 210 may include one or more lenses. According to an embodiment, the camera module 180 may include a plurality of lens assemblies 210. In this case, the camera module 180, for example, may be implemented as a dual camera, a 360-degree camera, or a spherical camera. Some of the plurality of lens assemblies 210 may have the same lens properties (e.g., a field of view, a focal length, autofocus, f numbers, or optical zoom), or at least one lens assembly may have one or more lens properties that are different from the lens properties of other lens assemblies. The lens assembly 210, for example, may include a wide-angle lens or a telephoto lens.

The flash 220 may emit light in order to compensate for an insufficient amount of light during photography. According to an embodiment, the flash 220 may include one or more light-emitting diodes (e.g., red-green-blue (RGB) LEDs, a white LED, an infrared LED, or an ultraviolet LED) or a xenon lamp. The image sensor 230 may convert the light emitted or reflected from a subject and transmitted through the lens assembly 210 into an electrical signal, thereby obtaining an image corresponding to the subject. According to an embodiment, the image sensor 230 may include, for example, one image sensor selected from various image sensors having different properties, such as an RGB sensor, a black-and-white (BW) sensor, an IR sensor, or a UV sensor, a plurality of image sensors having the same properties, or a plurality of image sensors having different properties. Each image sensor included in the image sensor 230 may be implemented using, for example, a charged coupled device (CCD) sensor or a complementary metal oxide semiconductor (CMOS) sensor.

In response to movement of the camera module 180 or the electronic device 101 including the same, the image stabilizer 240 may move at least one lens included in the lens assembly 210 or the image sensor 230 in a specific direction, or control the operation characteristics of the image sensor 230 (for example, control the read-out timing or the like). This makes it possible to compensate for at least some of the negative effects on the image to be captured due to the movement thereof. According to an embodiment, the image stabilizer 240, may detect such movement of the camera module 180 or the electronic device 101 using a gyro sensor (not shown) or an acceleration sensor (not shown) disposed inside or outside the camera module 180. According to an embodiment, the image stabilizer 240 may be implemented as, for example, an optical image stabilizer or optical image stabilization (OIS). The memory 250 may at least temporarily store at least some of the images obtained through the image sensor 230 for a subsequent image processing operation. For example, if obtaining of the image by a shutter is delayed or if a plurality of images is obtained at a high speed, the obtained original images (e.g., the Bayer-patterned images or high-resolution images) may be stored in the memory 250, and copy images corresponding thereto (e.g., low-resolution images) may be previewed through the display module 160. Thereafter, if a specified condition is satisfied (e.g., a user input or a system command), at least some of the original images stored in the memory 250 may be obtained and processed by, for example, the image signal processor 260. According to an embodiment, the memory 250 may be configured as at least part of the memory 130 or a separate memory operated independently of the same.

The image signal processor 260 may perform one or more image processing operations on the images obtained through the image sensor 230 or the images stored in the memory 250. One or more image processing operations may include, for example, depth map generation, three-dimensional modelling, panorama production, feature point extraction, image synthesis, or image compensation (e.g., noise reduction, resolution adjustment, brightness adjustment, blurring, sharpening, or softening). Additionally or alternatively, the image signal processor 260 may perform control (e.g., exposure time control, readout timing control, or the like) for at least one of the elements (e.g., the image sensor 230) included in the camera module 180. The image processed by the image signal processor 260 may be stored again in the memory 250 for further processing, or may be provided to an external element (e.g., the memory 130, the display module 160, the electronic device 102, the electronic device 104, or the server 108) of the camera module 180. According to an embodiment, the image signal processor 260 may be configured as at least part of the processor 120 or as a separate processor operated independently of the processor 120. In the case where the image signal processor 260 is configured as a separate processor from the processor 120, at least one image processed by the image signal processor 260 may be displayed through the display module 160 by the processor 120 without further processing or after further image processing.

According to an embodiment, the electronic device 101 may include a plurality of camera modules 180 having different properties or functions from each other. In this case, for example, at least one of the plurality of camera modules 180 may be a wide-angle camera, and at least another one thereof may be a telephoto camera. Similarly, at least one of the plurality of camera modules 180 may be a front camera, and at least another one thereof may be a rear camera.

Figure 3:
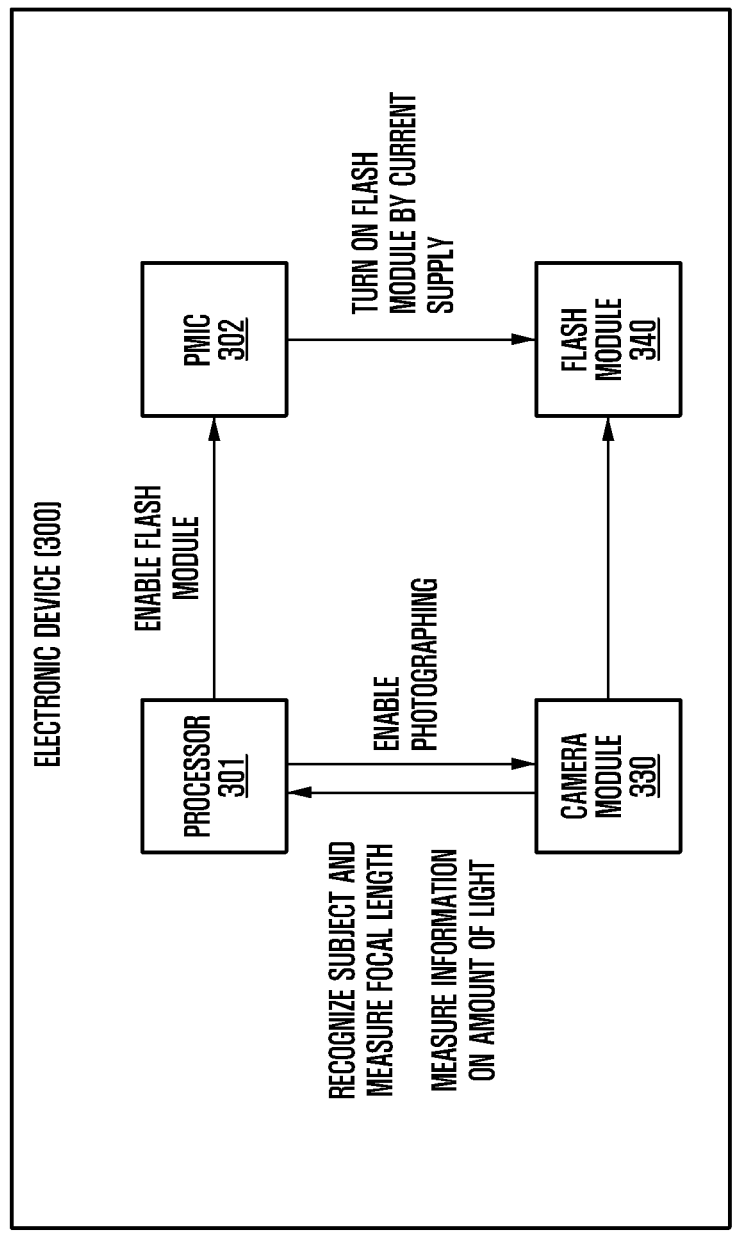
FIG. 3 is a block diagram illustrating operations of elements of an electronic device according to an embodiment of the disclosure.

FIG. 3 is a block diagram illustrating operations of elements of an electronic device according to an embodiment of the disclosure. According to an embodiment, the electronic device 300 may include a processor 301, a power management integrated circuit (PMIC) 302, a camera module 330, and a flash module 340, and some of the illustrated elements may be omitted or substituted. The electronic device may further include at least some of the configurations and/or perform at least some of the functions of the electronic device 101 in FIG. 1. At least some of the respective elements shown (or not shown) of the electronic device may be operatively, functionally, and/or electrically connected to each other.

According to an embodiment, the processor 301 may perform operations or data processing related to control and/or communication of the respective elements of the electronic device, and may be configured as one or more processors 301. The processor 301 may include at least some of the configurations and/or functions of the processor 120 in FIG. 1.

According to an embodiment, while not limiting the operations and data processing functions capable of being performed by the processor 301 in the electronic device, hereinafter, a detailed description will be made of the features related to control of the camera module 330 and the flash module 340. The operations of the processor 301 may be performed by loading the instructions stored in a memory (not shown).

According to an embodiment, the processor 301 may activate the camera module 330 and receive obtained image data from the camera module 330. For example, the processor 301 may transmit a photographing signal to the camera module 330, based on a user input, and the camera module 330 may produce image data corresponding to the photographing signal and transmit the same to the processor 301.

According to an embodiment, the processor 301 may obtain information on a subject, the focal length, and the amount of light from received image data. The camera module 330 may recognize a subject placed in front thereof and transmit information on the subject to the processor 301. In addition, the camera module 330 may measure the focal length, which is the distance between the point on which the light incident on the lens of the camera converges and the camera sensor, and transmit information thereon to the processor 301. In addition, the processor 301 may control the flash module 340 through the camera module 330, and the camera module 330 may measure information on the amount of light projected from the flash module 340 and transmit information thereof to the processor 301.

According to an embodiment, the processor 301 may control the PMIC 302 such that the flash module 340 may output light. According to this signal, the PMIC 302 may supply current to the flash module 340 and operate the flash module 340. The flash module 340 may be supplied with the current required for operation from the PMIC 302.

According to an embodiment, the electronic device 300 may include a plurality of camera modules. The electronic device 300 may further include at least one other camera module in addition to the camera module 330. The camera module 330 and at least one other camera module may be disposed in the electronic device 300 in the same direction to obtain images of an external object (e.g., a subject), or may be disposed in the different directions to obtain images of different external objects (e.g., subjects).

According to an embodiment, the flash module 340 may include an LED, a light-emitting diode, or a xenon lamp. Two or more lenses (a wide-angle lens, an ultra-wide-angle lens, or a telephoto lens) and image sensors may be disposed on one surface of the electronic device 300. In addition, the flash module 340 may provide a light source that interworks with the camera module 330. In addition, the flash module 340 may be disposed adjacent to the camera module 330.

Figure 4:
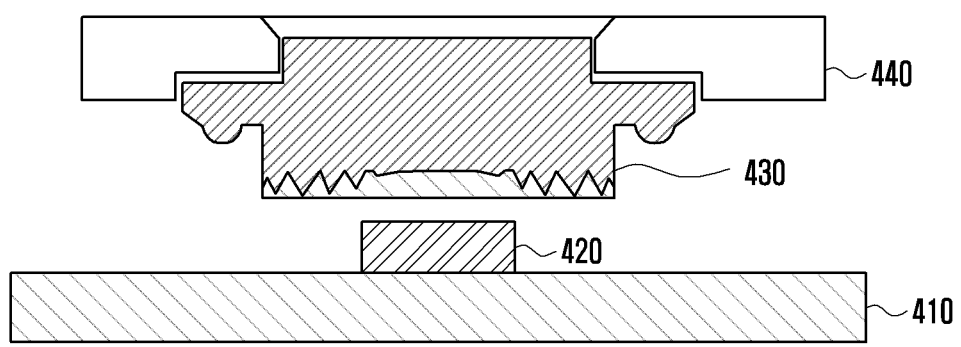
FIG. 4 is a structural diagram of an electronic device according to an embodiment of the disclosure.

FIG. 4 is a structural diagram of an electronic device according to an embodiment of the disclosure.

The electronic device may include an LED 420, a PCB area 410 on which the LED 420 is mounted, a flash lens 430, and a window plate 440. The LED 420 may emit light toward the center of the flash lens 430, and the light emitted from the LED 420 may reach the subject through the flash lens 430. The flash lens 430 may include a diffusion pattern area on one surface, which may serve to diffuse light.

Figure 5:
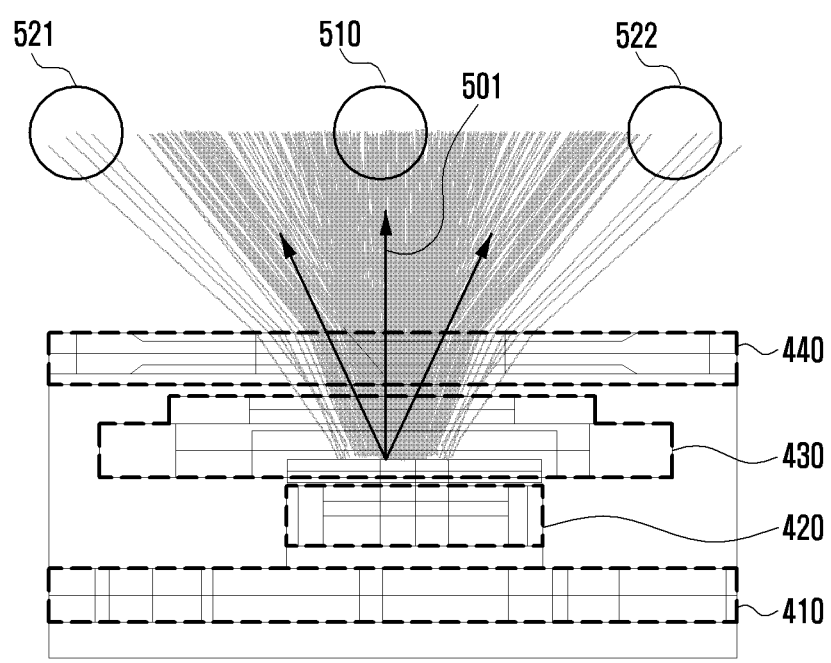
FIG. 5 illustrates paths and distribution of light when capturing an image using a conventional electronic device.

FIG. 5 illustrates paths and distribution of light when capturing an image using a conventional electronic device.

Referring to FIG. 5, the light 501 emitted from the LED 420 may reach the central portion 510 and the peripheral portions 521 and 522 through the flash lens 430. As shown in FIG. 5, it can be identified that a larger amount of light reaches the central portion 510 that is relatively close to the flash lens 430 and that a smaller amount of light reaches the peripheral portions 512 and 522 that are far therefrom compared to that of the central portion 510. In this case, when capturing an image, the cave-like phenomenon may occur in which the peripheral portions of the image are dark, whereas the central portion of the image may have glare due to reception of the large amount of light.

Figure 6:
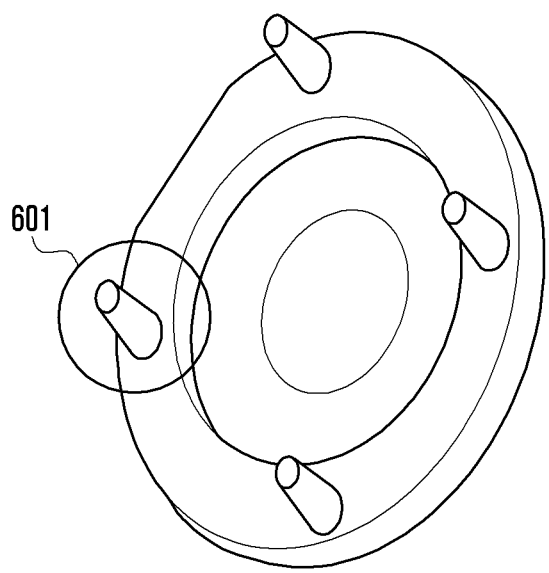
FIG. 6 is a three-dimensional view illustrating a model of an optical lens of an electronic device according to an embodiment of the disclosure.
Figure 6:
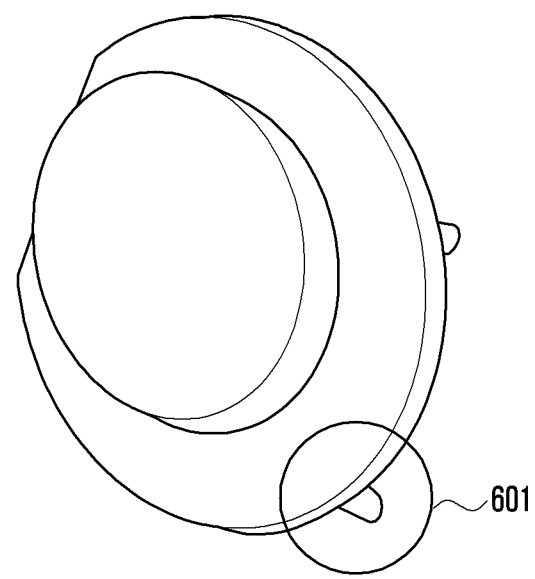

FIG. 6 is a three-dimensional view illustrating a model of an optical lens of an electronic device according to an embodiment of the disclosure. A lens support structure 601 may be provided on the lower portion of the optical lens to support the optical lens. The lens support structure 601 may come into contact with a first surface, and may be positioned on the peripheral portion of the first surface, instead of the central portion thereof, such that the light emitted from the LED is able to reach the first surface.

Figure 7:
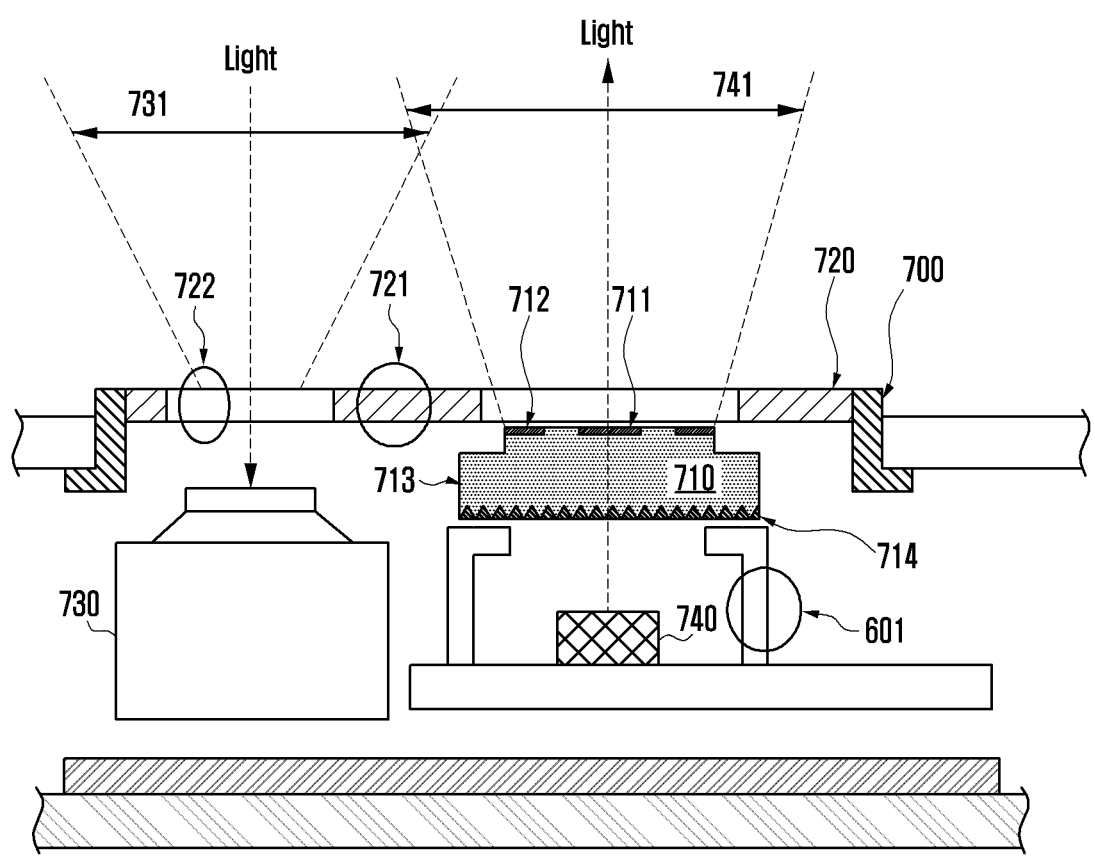
FIG. 7 is a structural diagram of an electronic device according to an embodiment of the disclosure.

FIG. 7 is a structural diagram of an electronic device according to an embodiment of the disclosure.

The electronic device 300 may include a housing 700, a window plate 720, a camera module 730, and a flash module. According to an embodiment, the flash module may include an optical lens 710 and an LED 740. In addition, a lens support structure 601 for supporting the optical lens 710 may be positioned under the optical lens 710. As described with reference to FIG. 6 above, the lens support structure 601 may come into contact with the first surface (e.g. a surface of the optical lens 710), and may be positioned on the peripheral portion of the first surface, instead of the central portion thereof, such that the light emitted from the LED 740 is able to reach the first surface.

According to an embodiment, the window plate 720 may include a transparent area 722 that transmits light and an opaque area 721 that blocks light. The window plate 720 may be positioned above the camera module 730 and the LED 740. The window plate 720 may be include the transparent area 722 allowing light to enter the camera module 730, and may also include additional transparent area 722 allowing light to project from the LED 740, and the remaining portions thereof may be configured as the opaque area 721 to block light.

According to an embodiment, the optical lens 710 may include a first surface in the direction facing the LED 740, that is, the direction in which the light emitted from the LED 740 is incident, and a second surface in the direction opposite the first surface, that is, the direction facing the subject. The optical lens 710 may include a diffusion pattern area 714 on the first surface, and include a first translucent area 711, a second translucent area 712, and a transparent area 713 on the second surface.

According to an embodiment, the diffusion pattern area 714 may serve to primarily diffuse light emitted from the LED 740. The diffusion pattern area 714 may include a plurality of circular sawtooth diffusion patterns that are radially arranged. The diffusion pattern area 714 may constitute the entirety of the first surface or only a portion of the first surface that covers the LED light projection area. The light emitted from the LED 740 may travel to the second surface through the diffusion pattern area 714 of the first surface. The transparent area 713 may be formed between the first surface and the second surface.

According to an embodiment, the second surface may reduce the amount of transmission light toward the center of the optical lens 710, thereby reducing the illuminance of the central portion. In addition, the second surface may include a translucent area in the peripheral portion in order to increase the amount of light directed to the periphery of the optical lens 710, thereby increasing the illuminance of the peripheral portion.

According to an embodiment, the transmittance of the first translucent area 711, the transmittance of the second translucent area 712, and the transmittance of the diffusion pattern area 714 may be the same. In addition, the transmittance of the transparent area 713 may be higher than the transmittance of the first translucent area 711 and the transmittance of the second translucent area 712.

According to an embodiment, the size and position of the first translucent area 711 may correspond to the size and position of the LED 740. In addition, the size and position of the first translucent area 711 may be affected by the light characteristics (e.g., a light incident angle and a direction in which light is directed) of the LED 740. For example, if the light incident angle of the LED 740 is largely biased towards the center, the need to guide the light to the peripheral portion may increase to prevent glare. In this case, the size and position of the first translucent area 711 may be determined to guide the light to the peripheral portion. In addition, the size and position of the second translucent area 712 may be determined according to a variable K (described below) indicating a positional relationship between the first camera module 730 and the LED 740.

Figure 8:
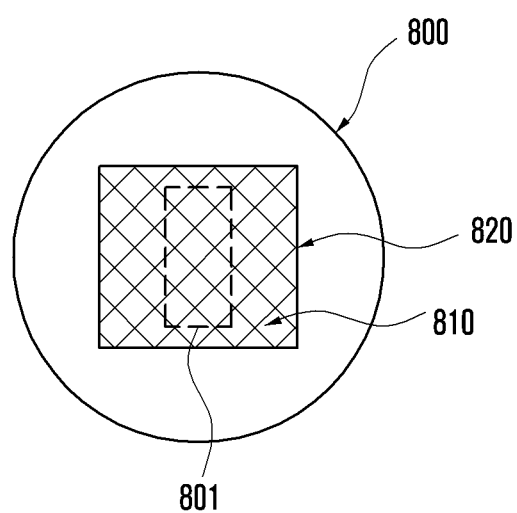
FIG. 8 is a plan view of an optical lens constituting an electronic device according to an embodiment of the disclosure.

FIG. 8 is a plan view of an optical lens constituting an electronic device according to an embodiment of the disclosure.

According to an embodiment, the optical lens 800 may include a first translucent area 810 in the window plate 820. FIG. 8 is a plan view of the optical lens 800, which illustrates a second surface on the side of the window plate 720. It has been described with reference to FIG. 7 above that the second surface includes a first translucent area 810 and a second translucent area. The first translucent area 810 may be configured to correspond to the LED 801 or to envelope the LED 801 in the plan view. The size and positioning of the second translucent area will be described below with reference to FIGS. 9 to 12.

Figure 9:
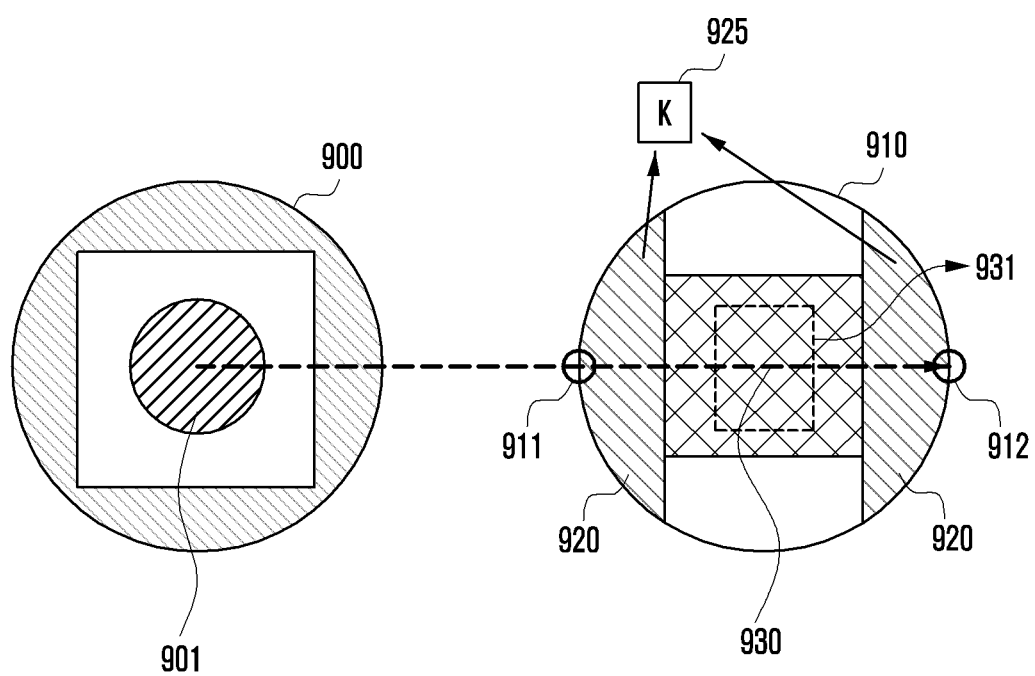
FIG. 9 is a plan view of an optical lens constituting an electronic device according to an embodiment of the disclosure.

FIG. 9 is a plan view of an optical lens constituting an electronic device according to an embodiment of the disclosure.

It has been described with reference to FIG. 7 above that the flash module of the electronic device 300 may include the optical lens 710, that the optical lens 710 may include the first surface and the second surface, and that the first translucent area 711, the second translucent area 712, and the transparent area 713 may be formed on the second surface of the optical lens 710. The light projected from the LED 740 may reach the second surface 910 through the diffusion pattern area 714 of the first surface. Hereinafter, the process of determining the position and size of the second translucent area 920 on the second surface will be described in detail.

According to an embodiment, the size of the second translucent area 920 may be determined according to a variable K 925 indicating a positional relationship between the camera module 900 and the LED 930.

According to an embodiment, the first point 911 and the second point 912 may be positioned on the second surface 910, and the first point 911 may correspond to the point closest to the center 901 of the camera module 900 when viewed from the front of the electronic device 300, and the second point 912 may correspond to the point farthest from the center 901 of the camera module 900 when viewed from the front of the electronic device 300.

According to an embodiment, the second translucent area 920 may be a bow-shaped area formed between the first point 911 and a point that is spaced apart therefrom in the direction to the center of the optical lens, where the size of the space corresponds to the variable K 925, and a bow-shaped area formed between the second point 912 and a point that is spaced apart therefrom in the direction to the center of the optical lens, where the size of the space corresponds to the variable K 925.

The variable K 925 may be used to determine the size and position of the second translucent area 920, and the variable K 925 may be affected by the fov of the camera module 900, the fov of the LED 740, the separated distance between the LED 740 and the camera module 900, and the diameter of the area of the optical lens 800. A process of determining the variable K 925, and the position and size of the second translucent area using the variable K 925 will be described in detail with reference to FIGS. 10 to 12.

Figure 10:
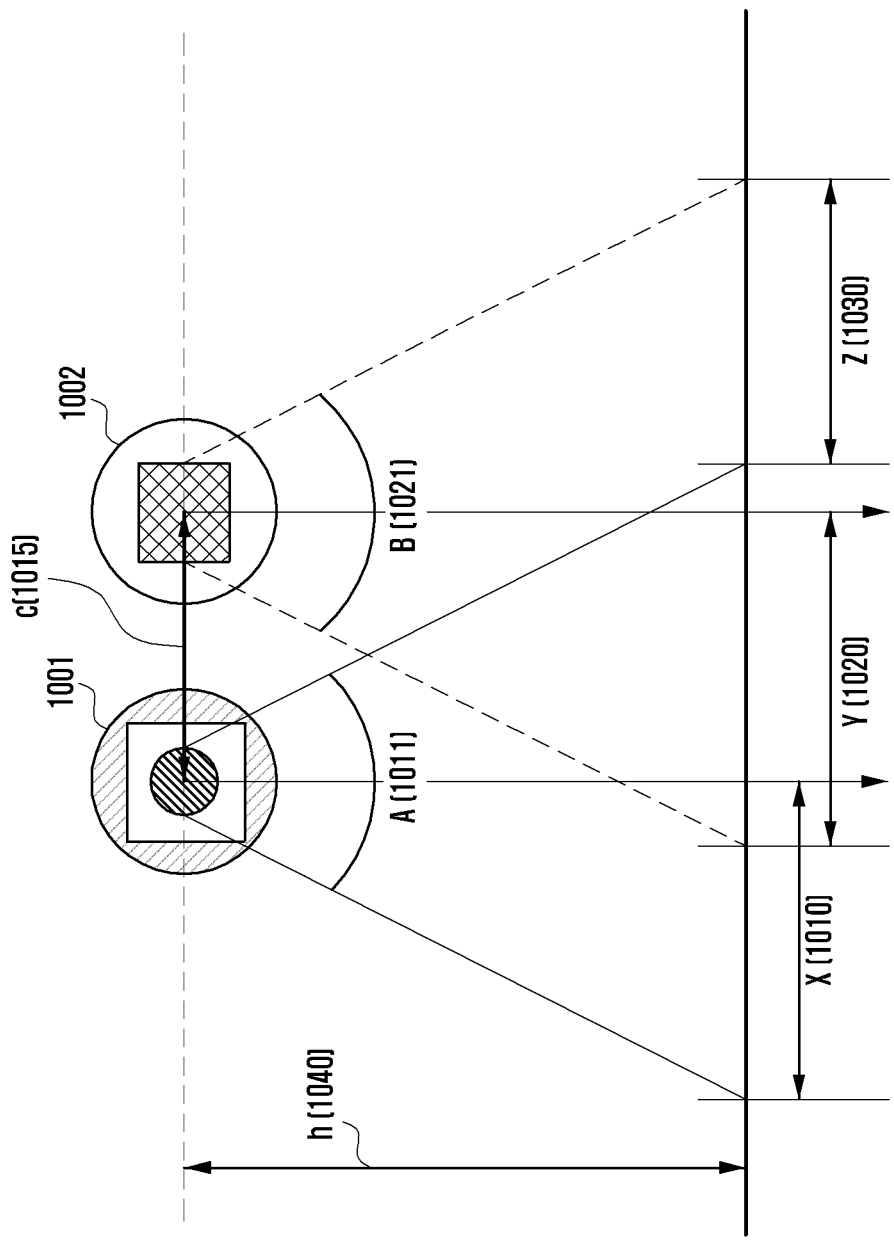
FIG. 10 is a diagram illustrating a process of obtaining a variable K according to an embodiment of the disclosure.

FIG. 10 is a diagram illustrating a process of obtaining a variable K according to an embodiment of the disclosure.

According to an embodiment, the size of the second translucent area 920 may be determined according to the variable K 925. As described with reference to FIG. 7 above, the variable K 925 is determined according to a positional relationship between the camera module 1001 and the LED 1002. Hereinafter, a detailed process of obtaining the variable K will be described.

According to an embodiment, the variable K 925 may satisfy the following conditions (1), (2), (3) and (4).

$$X = h/\tan(90 - A/2)° \tag{1}$$

$$Y = h/\tan(90 - B/2)° \tag{2}$$

$$Z = X - Y + c \tag{3}$$

$$K = (Z * \text{diameter of LED})/2Y \tag{4}$$

First, X 1010 may be the distance corresponding to the half of the photographing area of the camera module 1001, and the photographing area may vary depending on the distance to the subject. Hereinafter, a process of obtaining the variable K 925 will be described in detail on the condition that the vertical distance between the camera module 1001 and the subject is configured as h 1040.

X 1010 may be obtained using h 1040 and A 1011. A 1011 may represent a photographing angle of the camera module 1001, and if the half of A 1011 and the value h 1040 are given, the value X 1010 corresponding to the base of the triangle may be obtained using the trigonometric function. This may be expressed as follows. $X=h/\tan(90-A/2)°$ Y 1020 may be obtained using h 1040 and B 1021. As described above, B 1021 represents a projection angle of the LED 1002, and h 1040 represents the vertical distance to the subject. If the half of B 1021 and the value h 1040 are given, the value Y 1020 corresponding to the base of the triangle may be obtained using the trigonometric function. This may be expressed as follows. $Y=h/\tan(90-B/2)°$ Z 1030 may be obtained using X 1010, Y1020, and c 1015. c 1015 indicates the distance between the center of the camera module 1001 and the center of the LED 1002. The value Z 1030 may be obtained by adding c 1015 to X 1010 and then subtracting Y 1020 therefrom. This may be summarized and expressed as follows. $Z=X-Y+c$ The variable K 925, which is an arbitrary variable for obtaining the position and size of the second translucent area 920, may be represented using the diameter of the LED 1002, Z 1030, and Y 1020. According to an embodiment, the variable K may be defined as follows. $K=(Z*\text{diameter of LED})/2Y$ According to an embodiment, the distance 1040 between the center of the camera module 1001 and the subject may be based on 100 mm, which is an appropriate test reference distance. The distance 1040 between the center of the camera module 1001 and the subject is not fixed to 100 mm, and may be configured differently.

According to an embodiment, the distance between the camera module 1001 and the LED 1002 may be determined in consideration of a photographing range of the camera module 1001 and an emission range of the LED 1002. For example, the distance between the camera module 1001 and the LED 1002 may include 12.5 mm. In this case, the light emission area of the LED 1002 may include the photographing range of the camera module 1001. Accordingly, the light emitted from the LED may reach the entire photographing range of the camera module 1001, thereby obtaining an image in which the difference in brightness between the central portion and the peripheral portion is not large. However, the distance between the camera module 1001 and the LED 1002 is not limited to 12.5 mm, and any value may be considered as an appropriate distance as long as the light emission range of the LED 1002 includes the photographing range of the camera module 1001 in consideration of the photographing range of the camera module 1001 and the light emission range of the LED 1002.

Figure 11:
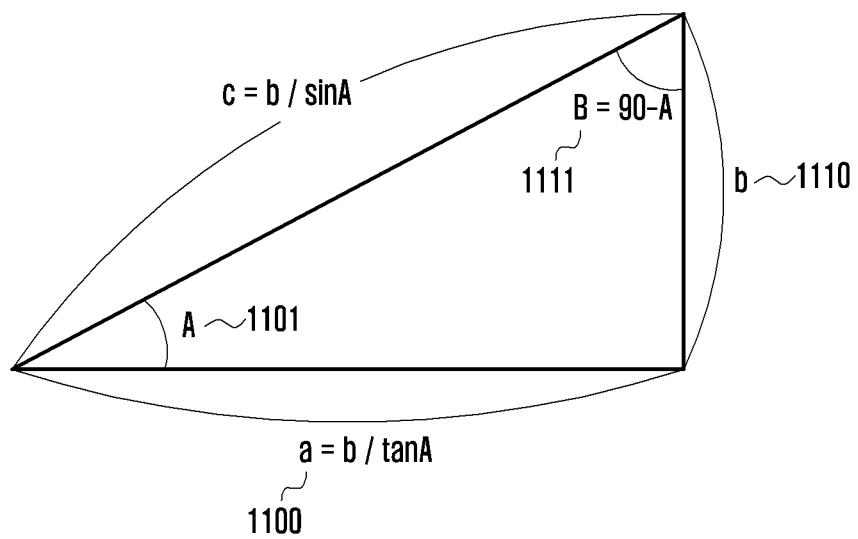
FIG. 11 illustrates a process of obtaining a variable K according to an embodiment of the disclosure.

FIG. 11 illustrates a process of obtaining a variable K according to an embodiment of the disclosure.

According to an embodiment, the angle A 1101 and the length of the surface b 1110 facing A 1101 may be required to obtain the length of the base a 1100. If one angle of a right triangle is given, the remaining angles may be obtained. That is, the angle A 1110 may be obtained using angle B 1111 that is the other non-right angle of the triangle. If the half of the field of view of the camera module 1001 is angle B 1111, the angle A 1101 may be obtained using the same. Assuming that the length of the vertical side b 1110 is h 1040 in FIG. 10, the length of the base a 1100 may be obtained. This may be expressed as the following equation.

$$a=b/\tan(90-B)=b/\tan(A)$$

According to an embodiment, this principle may be applied to FIG. 10. X 1010 may be obtained using the field of view A 1011 and h 1040 of the camera module 1001. In addition, Y 1020 may be obtained using the field of view B 1020 and h 1040 of the LED 1002. As described with reference to FIG. 10 above, Z 1030 may be obtained using X 1010, Y 1020, and c 1015. The variable K may be obtained through this process.

Figure 12:
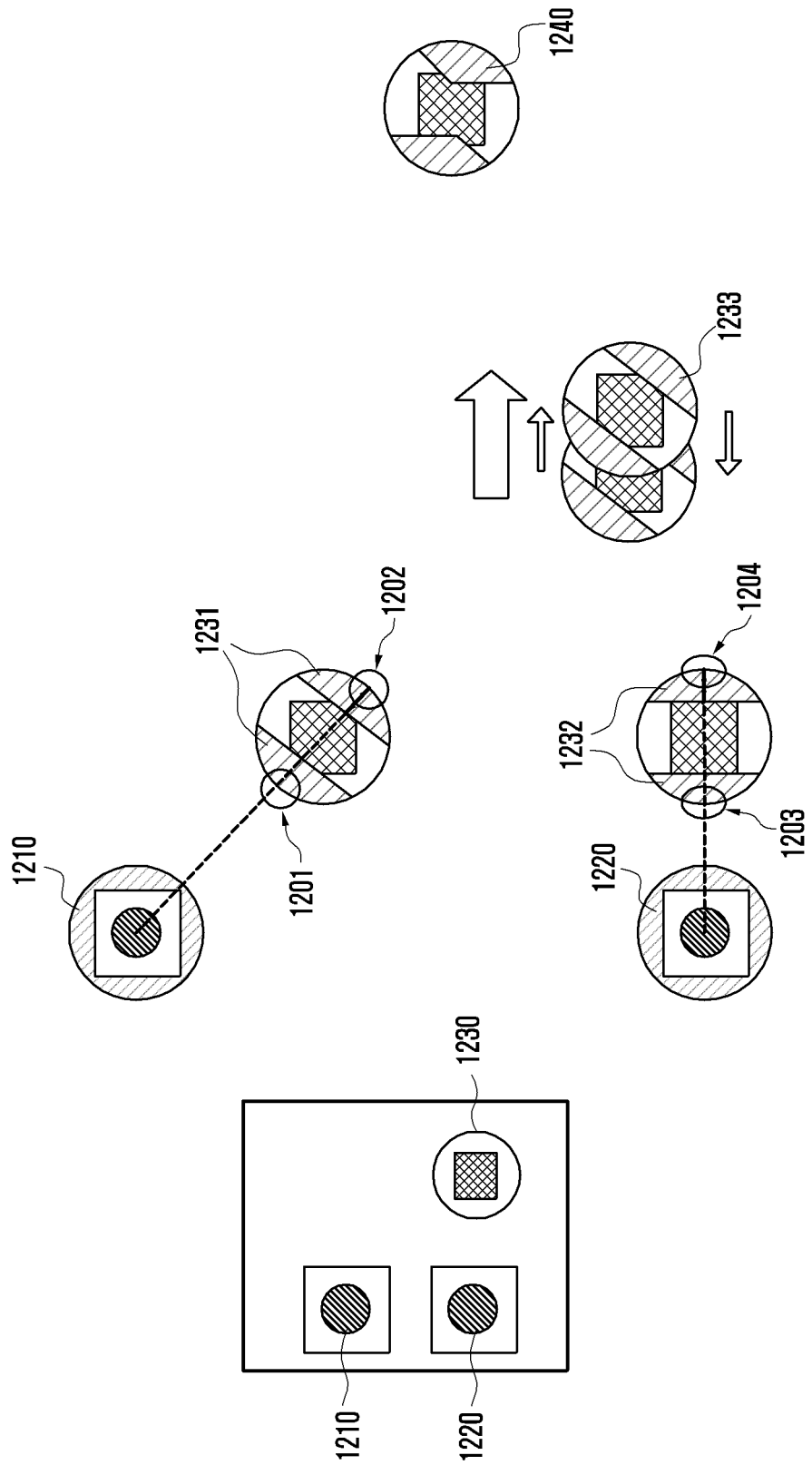
FIG. 12 illustrates a process of determining a translucent area in the case where there is a plurality of camera modules according to an embodiment of the disclosure.

FIG. 12 illustrates a process of determining a translucent area in the case where there is a plurality of camera modules according to an embodiment of the disclosure.

According to an embodiment, the electronic device 300 may include a flash module and a plurality of camera modules. Hereinafter, a description will be made on the assumption that the electronic device 300 includes one optical lens area 1230, a first camera module 1210, and a second camera module 1220.

According to an embodiment, as described with reference to FIG. 7 above, a first translucent area may be determined according to the position of the LED, and the position of the second translucent area may be determined according to the position of the camera module.

According to an embodiment, the position of the second translucent area 1231 may be determined using relative positions of the first camera module 1210 and the LED, and a variable K1. In addition, the position of the second translucent area 1232 may be determined using relative positions of the second camera module 1220 and the LED 1230, and a variable K2. A detailed process thereof is the same as that described in FIGS. 10 and 11.

According to an embodiment, the second surface may include a first point 1201, a second point 1202, a third point 1203, and a fourth point 1204, wherein the first point 1201 may correspond to the point closest to the center of the first camera module when viewed from the front of the electronic device, wherein the second point 1202 may correspond to the point farthest from the center of the first camera module when viewed from the front of the electronic device, wherein the third point 1203 may correspond to the point closest to the center of the second camera module when viewed from the front of the electronic device, and wherein the fourth point 1204 may correspond to the point farthest from the center of the second camera module when viewed from the front of the electronic device.

According to an embodiment, only an overlapping portion between the second translucent area 1231 of the first camera module 1210 and the second translucent area 1232 of the second camera module 1220 may be determined as a final translucent area 1240.

Figure 13:
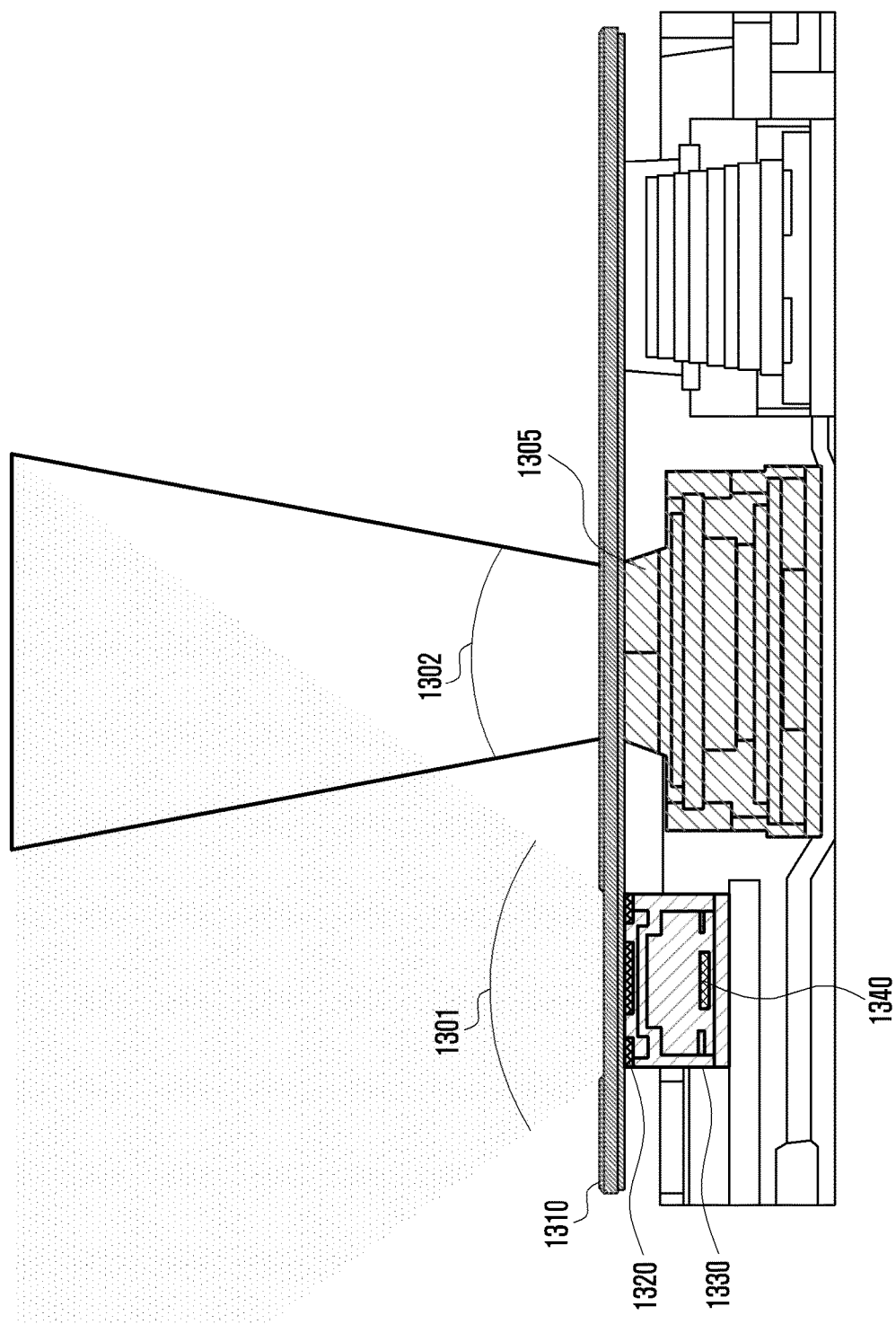
FIG. 13 is a side view of the structure of an electronic device according to an embodiment of the disclosure.

FIG. 13 is a side view of the structure of an electronic device according to an embodiment of the disclosure.

According to an embodiment, the electronic device may include a camera deco glass 1310, a translucent area 1320, an optical lens 1330, an LED 1340, and a camera module 1305. The camera deco glass 1310 may be provided on the front part of the optical lens 1330 to protect the surface of the optical lens 1330 from external impact. The roles and positions of the translucent area 1320, the optical lens 1330, the LED 1340, and the camera module 1305 have been described in detail with reference to FIG. 7.

According to an embodiment, the field of view 1301 of the LED 1340 may be for example 76 degrees. The field of view 1302 of the camera module 1305 may be for example 79 degrees. The field of view 1301 of the LED 1340 may be expanded to 121 degrees, which is increased by 45 degrees, by applying the optical lens 1330 including the translucent area 1320. If the field of view 1301 of the LED 1340 is expanded, the area capable of being photographed by the camera module 1350 and the light emission area that the light produced by the LED 1340 are more overlapped. As the area capable of being photographed by the camera module 1350 increasingly overlaps the light emission area that the light produced by the LED 1340, it is possible to capture images in which the light is evenly spread to the periphery of the images.

Figure 14:
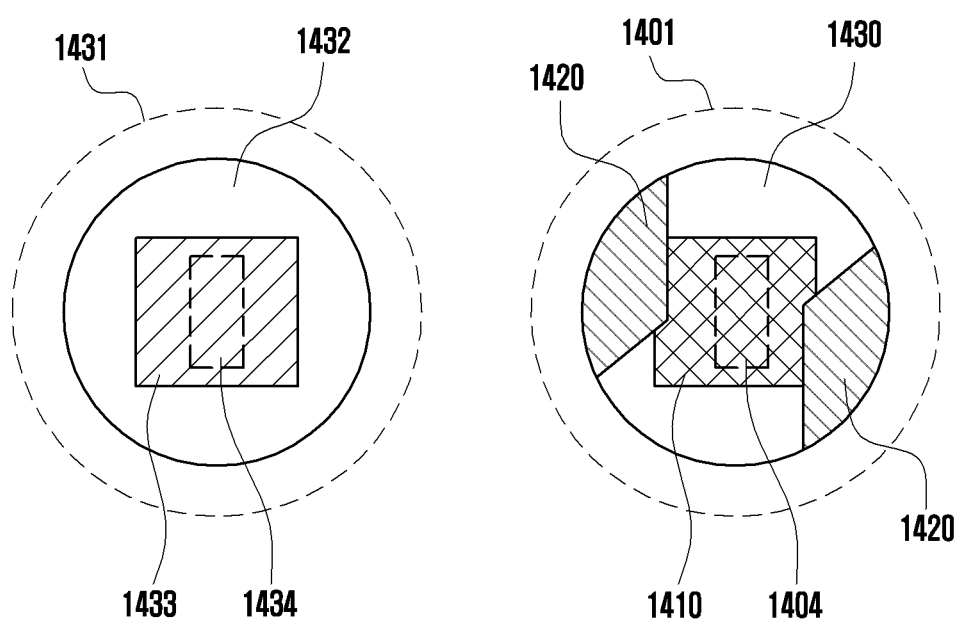
FIG. 14 is a plan view illustrating a conventional optical lens and an optical sensor to which a translucent area is applied according to an embodiment of the disclosure.

FIG. 14 is a plan view illustrating a conventional optical lens and an optical lens to which a translucent area is applied according to an embodiment of the disclosure.

According to an embodiment, since the distance between the LED 1404 and a subject is usually shorter than the distance to the background, the illuminance of the image may be uneven. Accordingly, the subject in the image may be shiny, and the background in the image may be relatively dark.

An improved optical lens 1401 of the disclosure may have an LED 1404 positioned at the center thereof, and the light may pass through a second surface of the optical lens positioned on the side of the window plate. As shown in FIG. 14, the second surface of the optical lens may include translucent areas 1410 and 1420.

According to an embodiment, a first translucent area 1410 may be positioned at the central portion of the second surface 1402 of the optical lens, a second translucent area 1420 may be positioned at the peripheral portion of the second surface 1402 of the optical lens, and a transparent area 1430 may be positioned at the remaining portions of the second surface 1402 of the optical lens, excluding the first translucent area 1410 and the second translucent area 1420. The configurations of the optical lens 1401 may be compared with components 1431-1434 of the conventional optical lens 1431.

According to an embodiment, the size and position of the first translucent area 1410 may be determined according to the size and position of the LED 1403.

According to an embodiment, the size and position of the second translucent area 1420 may be determined according to a variable K indicating a positional relationship between the first camera module and the LED.

According to an embodiment, the first translucent area 1410 positioned at the central portion of the second surface 1402 of the optical lens may reduce the amount of light directed to the subject from the center. Accordingly, the glare on the subject may be prevented. In addition, the second translucent area 1420 positioned at the peripheral portion of the second surface 1402 of the optical lens may refract the light directed to the peripheral portion to expand the light emission area, and increase the amount of light reaching the peripheral portion. That is, the peripheral portion (background) of the image may be relatively brightened through the second translucent area 1420. In addition, the brightness of the outermost portion may be even, thereby maintaining a constant average brightness of the light emission area. According to this, an image in which light is evenly distributed may be obtained.

Figure 15:
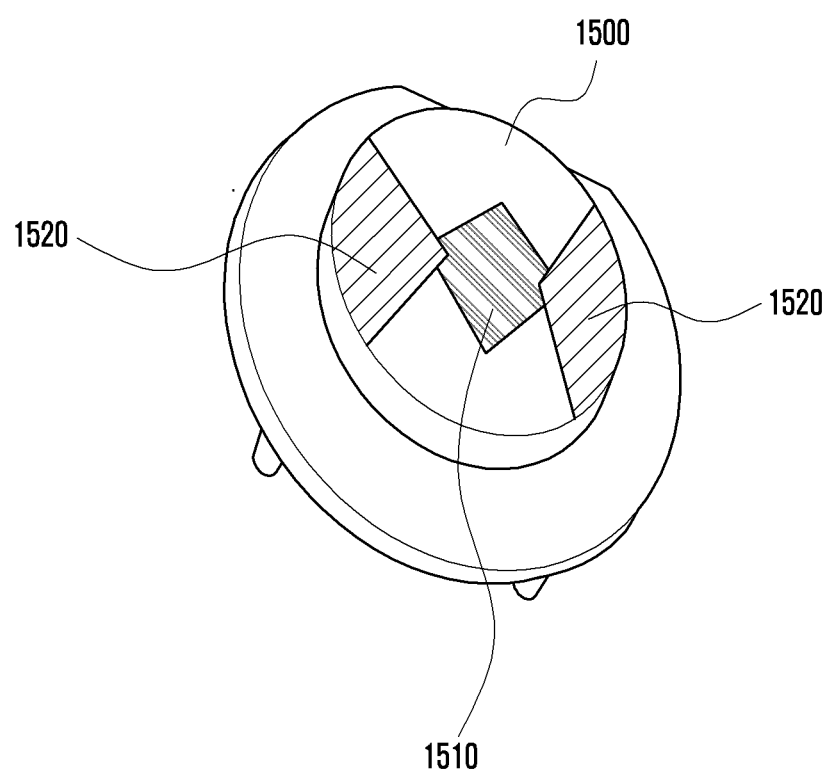
FIG. 15 illustrates a model of an optical lens of an electronic device according to an embodiment of the disclosure.

FIG. 15 illustrates a model of an optical lens of an electronic device according to an embodiment of the disclosure.

According to an embodiment, the optical lens may include a first translucent area 1510 at the central portion thereof, and include a second translucent area 1520 at the peripheral portion thereof. The translucent areas 1510 and 1520, unlike the transparent area 1500, may be made using various methods such as sand-blasting, acid-etching, or attaching a translucent film. In the case of using the methods of sand-blasting and acid-etching, the transmittance may be changed through surface treatment of the transparent area. In the case of using the method of attaching a translucent film, the translucent areas 1510 and 1520 may have a material different from that of the transparent area 1500, thereby making a difference in the transmittance.

Figure 16:
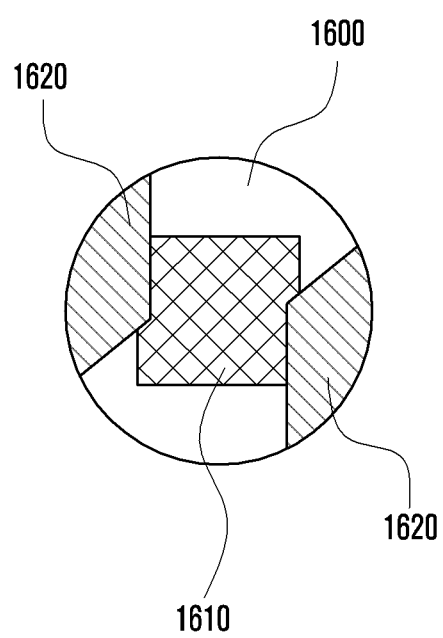
FIG. 16 is a plan view of an optical lens of an electronic device according to an embodiment of the disclosure.

FIG. 16 is a plan view of an optical lens of an electronic device according to an embodiment of the disclosure.

According to an embodiment, the optical sensor may include a first translucent area 1610 at the central portion thereof, and include a second translucent area 1620 at the peripheral portion thereof. The remaining portions, excluding the first translucent area 1610 and the second translucent area 1620, may correspond to a transparent area 1600 in the cross section of the optical sensor. The translucent areas 1610 and 1620, unlike the transparent area 1600, may be made using at least one of the methods of sand-blasting, acid-etching, or attaching a translucent film. As described with reference to FIG. 15 above, the translucent areas 1610 and 1620 may have a material different from that of the transparent area 1600.

Figure 17:
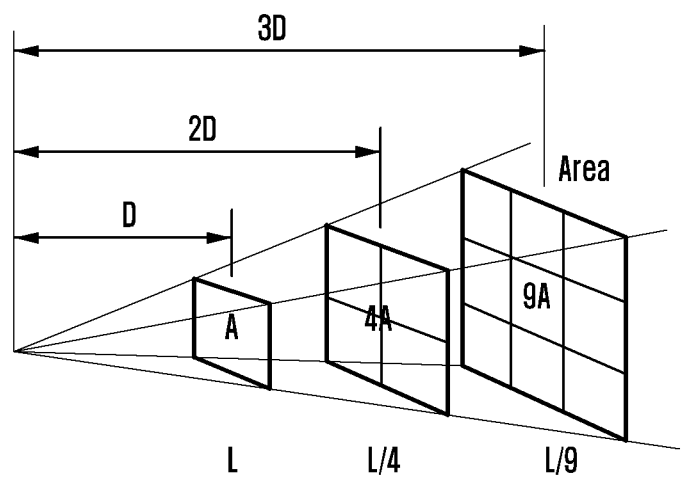
FIG. 17 illustrates a process of determining transparency of a translucent area of an electronic device according to an embodiment of the disclosure.

FIG. 17 illustrates a process of determining transparency of a translucent area of an electronic device according to an embodiment of the disclosure.

According to an embodiment, as the distance from the light source increases, the illuminance may decrease, and the light emission area may increase. If the distance from the light source is D, the illuminance may be L, and the light emission area may be A. If the distance from the light source is 2D, the illuminance may be L/4, and the light emission area may be 4 A. If the distance from the light source is 3D, the illuminance may be L/9, and the light emission area may be 9 A. In the FIG. 17 example, the unit of illuminance may be Lux, the unit of distance may be meters, and the unit of area may be square meters.

According to an embodiment, the required amount of light and the light emission area may vary depending on the distance from the light source, so the amount of light from the LED and the transparency of the translucent area of the optical sensor may be determined according. For example, in the case where a large amount of light is required due to a large light emission area, the amount of light passing through may be increased by increasing the transparency. In the case where the amount of emitted light is required to be reduced, the amount of light passing through may be reduced by lowering the transparency.

Figure 18:
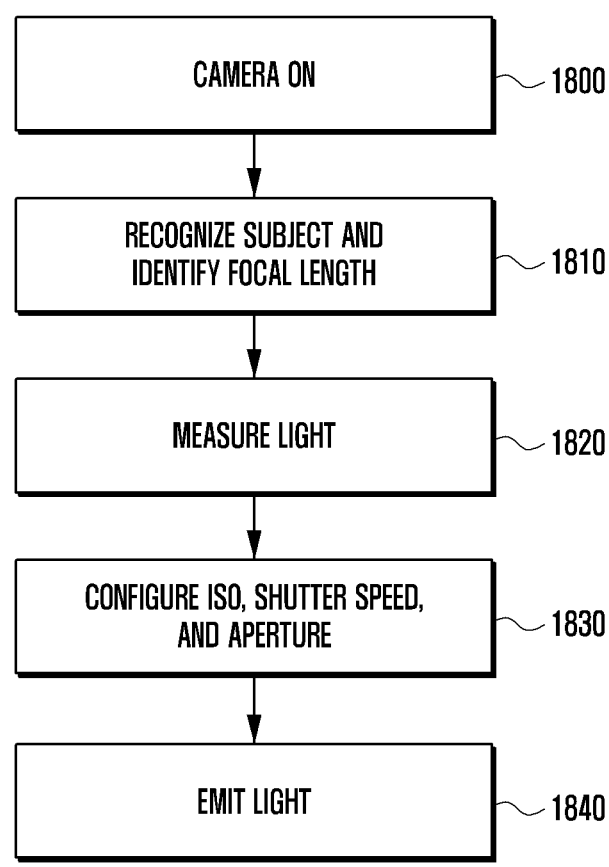
FIG. 18 is a flowchart illustrating the operation of an electronic device according to an embodiment of the disclosure.

FIG. 18 is a flowchart illustrating the operation of an electronic device according to an embodiment of the disclosure.

According to an embodiment, in operation 1800, the processor of the electronic device may control the camera module. That is, the processor may turn on/off the camera module.

In operation 1810, if the camera module is operated by the processor, the camera module may recognize a subject and identify a focal length. The focal length may indicate the distance between the point on which the light entering through the camera lens converges and the camera sensor. The camera module may transmit subject recognition information and focal length information to the processor.

In operation 1820, the camera module may measure light according to the position of the subject and the focal length.

Here, measuring light may refer to a process of calculating the intensity of light. Projection of light is done by a flash module, and the processor may control the operation of the flash module through a PMIC.

In operation 1830, when the measuring light is performed by the camera module, the camera module may transmit corresponding information to the processor. The processor may adjust configuration of international standard organization (ISO) sensitivity, a shutter speed, and aperture of the camera module, based on the received light measuring information.

In operation 1840, when the sensitivity, the shutter speed, and the aperture of the camera module are configured by the processor, the processor may turn on the flash module. The flash module turned on by the processor may include an LED and an optical lens, and may project light using the internal LED. The process in which the light projected from the LED evenly reaches the subject and the background area through the first surface and the second surface of the optical lens has been described with reference to FIGS. 7 to 11.

Figure 19:
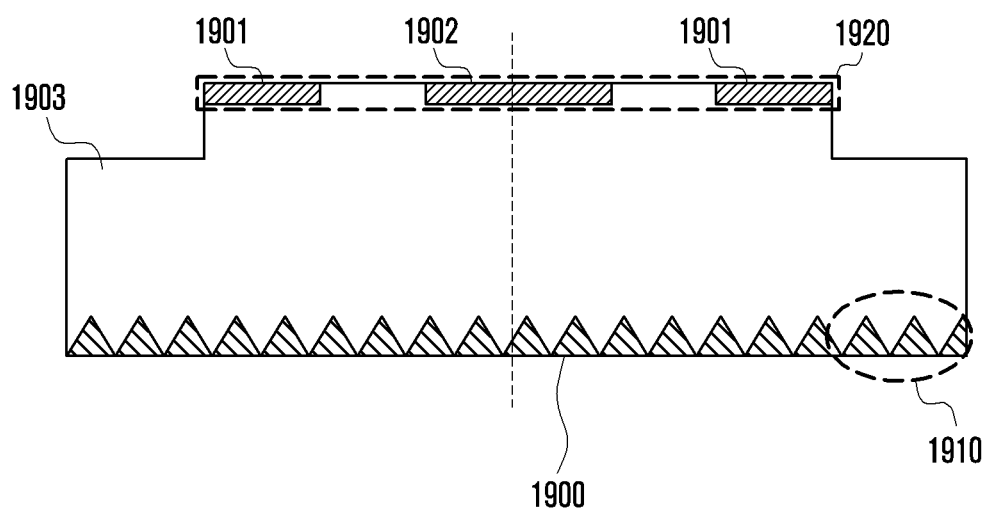
FIG. 19 is a detailed view illustrating the structure of an optical lens according to an embodiment of the disclosure.

FIG. 19 is a detailed view illustrating the structure of an optical lens according to an embodiment of the disclosure.

According to an embodiment, the optical lens 1900 may include a first translucent area 1901, a second translucent area 1902, and a transparent area 1903 on one surface thereof As described with reference to FIG. 7 above, the first translucent area 1901 may control a first illuminance of the central area of an image, the second translucent area 1902 may control a second illuminance of the peripheral area of the image, and the transparent area 1903 may transmit the entire light emitted from the LED because the transparency thereof is about 100%.

According to an embodiment, the optical lens 1900 may include a first surface 1910 and a second surface 1920. As described with reference to FIG. 7 above, the first surface 1910, which is one surface of the optical lens 1900, may be positioned on the side of the LED side and include a diffusion pattern area that controls a diffusion range of the light emitted from the LED, and the second surface 1920, which is the other surface of the optical lens 1900, may be positioned on the side of the window plate and include the first translucent area 1901, the second translucent area 1901, and the transparent area 1903.

Figure 20:
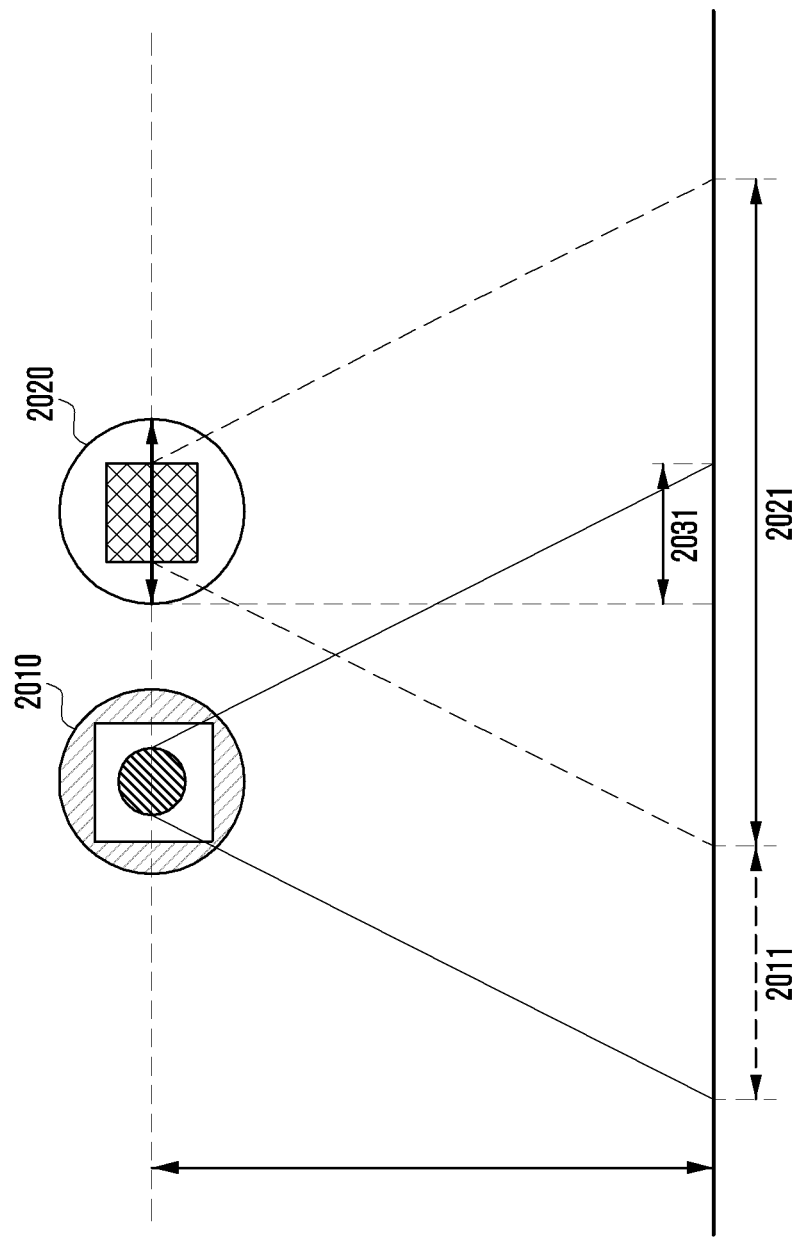
FIG. 20 illustrates a camera module and a light emission angle of an LED according to an embodiment of the disclosure.

FIG. 20 illustrates a camera module and a light emission angle of an LED according to an embodiment of the disclosure.

According to an embodiment, a camera module 2010 may have a field of view (FOV) of 79 degrees, and an LED 2020 may have a field of view (FOV) of 76 degrees. If the light emission angle of the LED 2020 is 76 degrees, it is difficult to cover cameras having a standard field of view of 79 degrees and a wide field of view of 120 degrees.

In addition, since the photographing range of the camera module 2010 and the light emission range 2021 of the LED 2020 are different, there may be an area 2011 in which light emitted from the LED 2020 fails to reach the camera module 2010. In this case, the cave-like phenomenon may occur in the corresponding area 2011 of captured images. On the other hand, the area 2031 close to the LED 2020 may have glare in the captured images because a relatively large amount of light emitted from the LED 2020 reaches the area.

Figure 21:
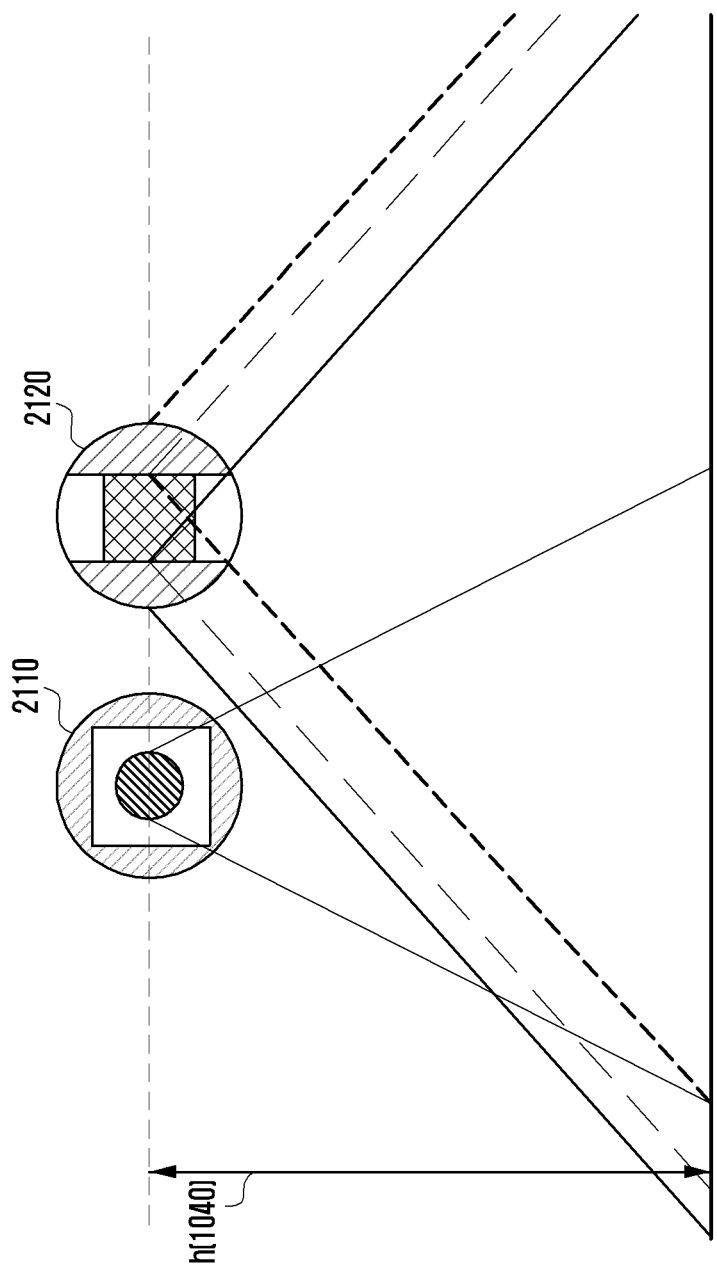
FIG. 21 illustrates a camera module and a light emission angle of an LED according to an embodiment of the disclosure.

FIG. 21 illustrates a camera module and a light emission angle of an LED according to an embodiment of the disclosure.

According to an embodiment, a camera module 2110 may have a field of view (FOV) of 79 degrees, and an LED 2120 may have a field of view (FOV) of 76 degrees. But in FIG. 21, in contrast with FIG. 20, the light emission angle of the LED 2120 may increase according to the transparency of a translucent area.

According to an embodiment, a projection angle of the LED 2120 may be adjusted by adjusting the transparency of the translucent area of an optical sensor. When the transparency of the translucent area is 90%, the projection angle of the LED 2120 may be 76 degrees, when the transparency of the translucent area is 50%, the projection angle of the LED 2120 may be 121 degrees, which is increased by 45 degrees, when the transparency of the translucent area is 59%, the projection angle of the LED 2120 may be 116 degrees, which is increased by 40 degrees, and when the transparency of the translucent area is 25%, the projection angle of the LED 2120 may be 136 degrees, which is increased by 60 degrees.

Figure 22:
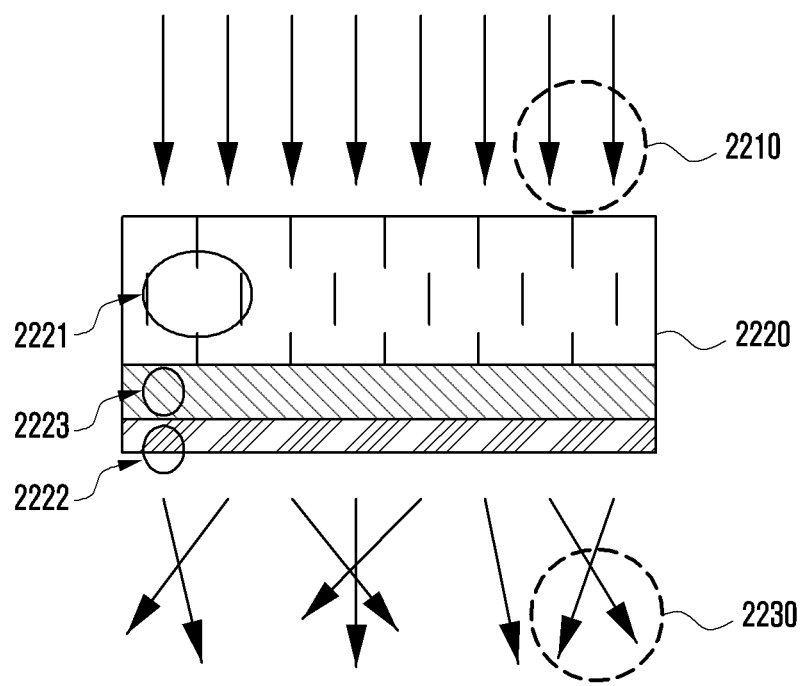
FIG. 22 illustrates the direction of light passing through a translucent area according to an embodiment of the disclosure.

According to an embodiment, if the light emission angle of the LED 2120 is changed, the light emission area of the LED 2120 may be changed, and the light emission area of the LED 2120 may be adjusted by adjusting the transparency of the optical lens. FIG. 22 illustrates the direction of light passing through a translucent area according to an embodiment of the disclosure.

According to an embodiment, the LED incident light 2210 may be incident on the optical lens 2220 in parallel. The optical lens 2220 may include a first surface 2221 including a diffusion pattern area, and a second surface 2222 including a transparent area 2223, a first translucent area, and a second translucent area. The lens transmission light 2230 passing through the optical lens 2220 may be directed toward the peripheral portion, or may be redirected toward the central portion. This may increase the light emission area and the emission angle, and, as a result, an increased amount of light may reach the peripheral portion of the image. As shown in FIG. 22, the transmittance of the translucent area may be changed, and the light emission angle may be changed according to a change in the transmittance as described above.

Figure 23:
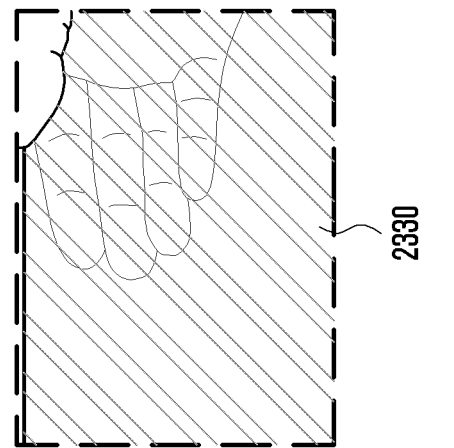
FIG. 23 illustrates a method of implementing a translucent area according to an embodiment of the disclosure.
Figure 23:
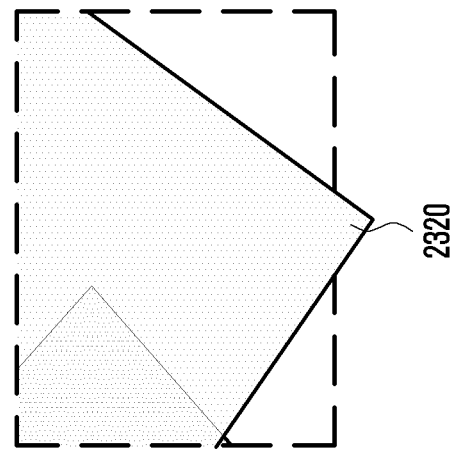
Figure 23:
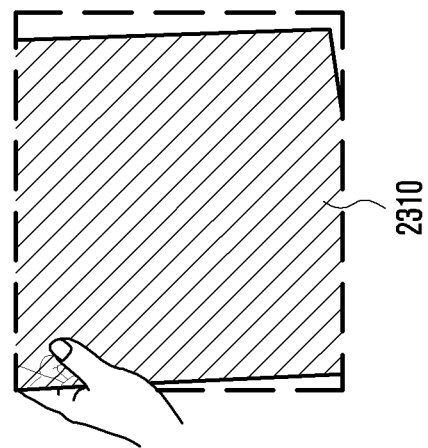

FIG. 23 illustrates a method of implementing a translucent area according to an embodiment of the disclosure.

According to an embodiment, the translucent area may be implemented using methods of sand-blasting 2310, acid-etching 2320, or attaching a translucent film 2330. Using the method of sand-blasting 2310, the translucent area becomes opaque by roughening the surface thereof through spraying high-pressure emery. Using the method of acid-etching 2320, the translucent area becomes opaque by performing an acid-etching process while maintaining the surface smooth. Using the method of attaching a translucent film 2330, the translucent area becomes opaque by mixing impurities during production of a film.

According to an embodiment, in the case of sand-blasting 2310, a desired transparency may be obtained using an abrasive onto the surface of the flash lens or deco glass. In the case of acid-etching 2320, like the sand-blasting 2310, a desired transparency may be obtained using an abrasive onto the surface of the flash lens or deco glass. However, since the acid-etching 2320 provides a smooth surface, it may further have an advantage in which light is smoothly expanded compared with the sand-blasting 2310. The method of attaching a translucent film 2330 uses a film having a predetermined transparency, and may have an advantage of more accurately realizing a desired transparency.

According to an embodiment, the transparency of the translucent area may be determined in consideration of a required light emission area and a distance to the subject, and the details thereof have been described above with reference to FIGS. 21 to 23.

Figure 24:
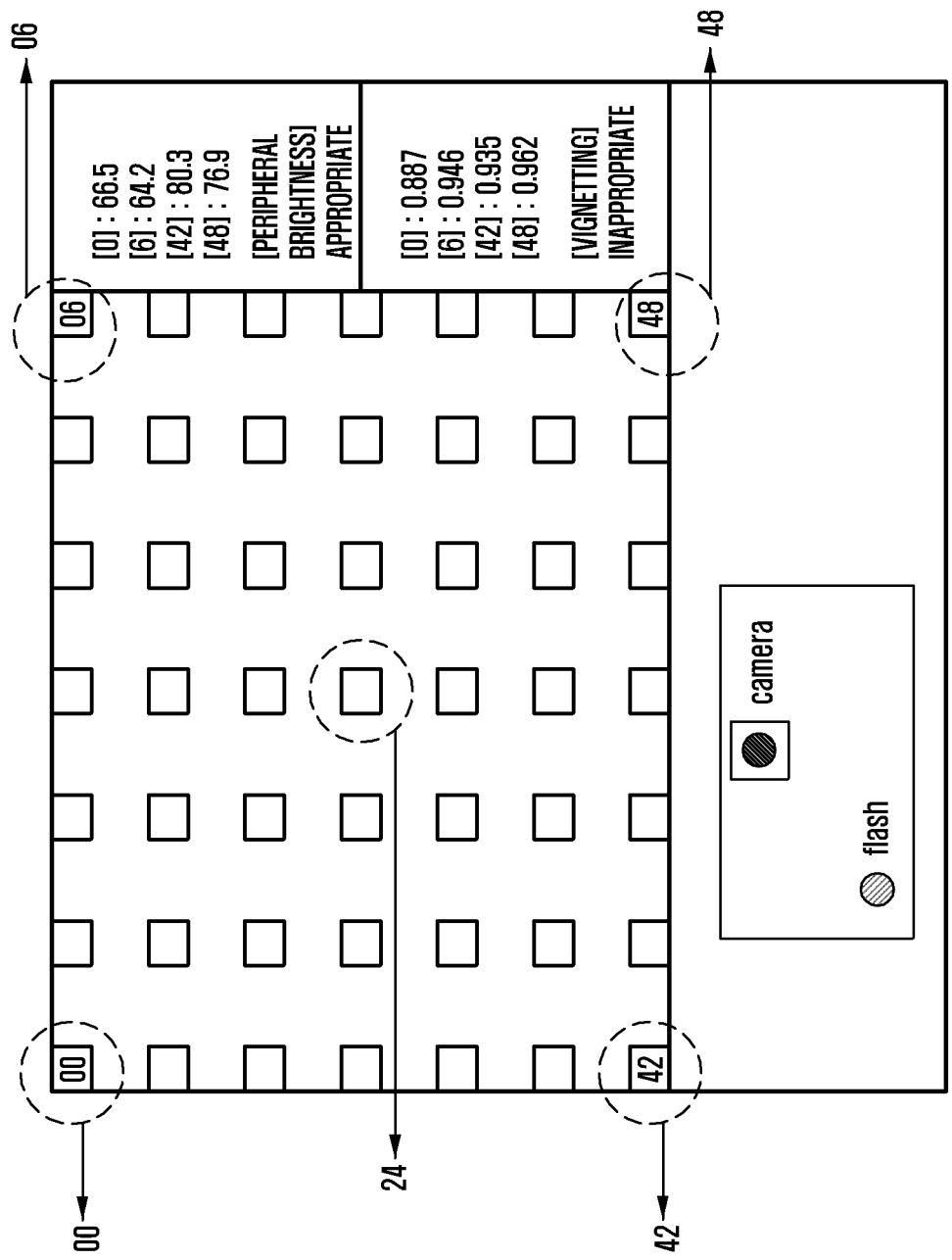
FIG. 24 illustrates an image captured using a conventional electronic device.

FIG. 24 illustrates an image captured using a conventional electronic device. According to an embodiment, the peripheral portion may be divided into left upper corner 00 and lower corner 42, and right upper corner 06 and lower corner 48. The brightness of the left upper corner area 00 is measured to be 66.5, the brightness of the right upper corner area 06 is measured to be 64.2, the brightness of the left lower corner 42 area is measured to be 80.3, and the brightness of the right lower corner 48 area is measured to be 76.9. The unit of measurement for the brightness is lux. The flash device is located in the left lower corner 42 area. Therefore, it can be seen that the left lower corner 42 has the highest brightness value and that this value decreases as it gets closer to the upper corner. In particular, the right upper corner 06 area, which is farthest from the flash, has the minimum brightness value of 64.2.

According to an embodiment, the peripheral brightness may indicate a degree of relative brightness with respect to the central area 24. An appropriate degree of a peripheral brightness value may be based on 60%, which may vary depending on the configuration of the cameras and the flash.

According to an embodiment, a vignetting value may indicate a relative value obtained by comparing the brightness of the left upper corner 00 and lower corner 42, and right upper corner 06 and lower corner 48 areas with the brightness of the peripheral regions thereof. The peripheral regions may include up to 10% of the four corner areas.

According to an embodiment, the vignetting value of the left upper corner area is 0.887, the vignetting value of the right upper corner area is 0.948, the vignetting value of the left lower corner area is 0.935, and the vignetting value of the right lower corner area is 0.962. An appropriate reference of the vignetting value may be 0.9 to 1.03, which may vary depending on the configuration of the cameras and the flash. It can be seen that the vignetting value of the left upper corner area is 0.887 when photographing according to the prior art, which falls outside of 0.9 to 1.03 and is thus inappropriate.

Figure 25:
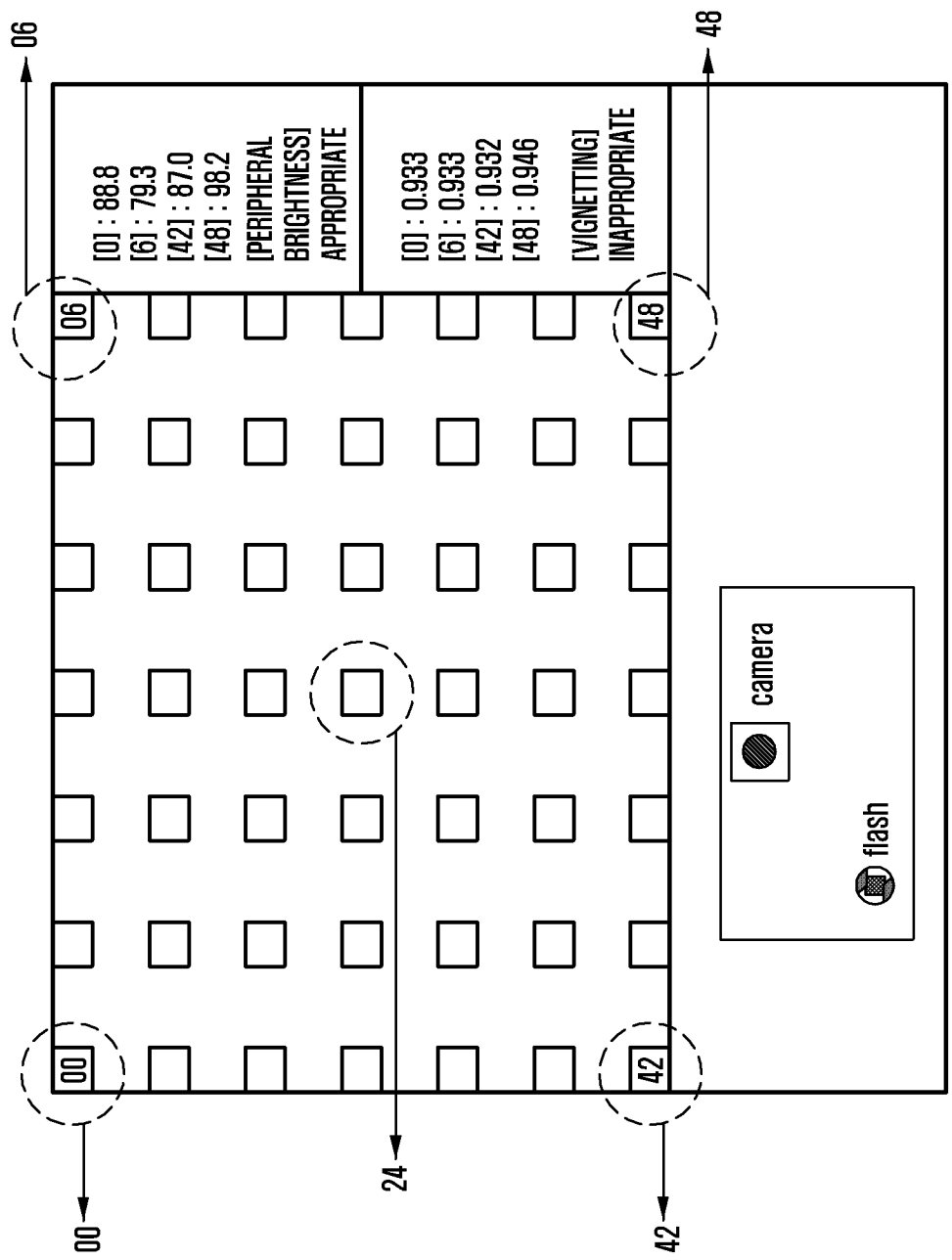
FIG. 25 illustrates an image captured by applying a translucent area to an electronic device according to an embodiment of the disclosure.

FIG. 25 illustrates an image captured by applying a translucent area to an electronic device according to an embodiment of the disclosure.

According to an exemplary embodiment, the peripheral portion may be divided into left upper corner 00 and lower corner 42, and right upper corner 06 and lower corner 48. The brightness of the left upper corner area 00 is measured to be 88.8, the brightness of the right upper corner area 06 is measured to be 79.3, the brightness of the left lower corner 42 area is measured to be 87.0, and the brightness of the right lower corner 48 area is measured to be 98.2. The unit of measurement for the brightness is lux. The flash device is located in the left lower corner 42 area. However, unlike the conventional flash shown in FIG. 24, the vignetting value can be improved by applying a translucent area in the disclosure.

According to an embodiment, when the translucent area is applied, it can be seen that the brightness value relative to the central portion is higher than that of the prior art and that the peripheral portions have uniform brightness therethrough.

According to an embodiment, the peripheral brightness may indicate a degree of relative brightness with respect to the central area 24. An appropriate degree of a peripheral brightness value may be based on 60%, which may vary depending on configuration.

According to an embodiment, a vignetting value may indicate a relative value obtained by comparing the brightness of the left upper corner 00 and lower corner 42, and right upper corner 06 and lower corner 48 areas with the brightness of the peripheral regions thereof. The peripheral regions may include up to 10% of the four corner areas.

According to an embodiment, the vignetting value of the left upper corner area is 0.933, the vignetting value of the right upper corner area is 0.933, the vignetting value of the left lower corner area is 0.932, and the vignetting value of the right lower corner area is 0.946. An appropriate reference of the vignetting value may be 0.9 to 1.03, which may vary depending on the configuration. It can be seen that, unlike the prior art, the vignetting values of the peripheral portions fall within 0.9 to 1.03 when the translucent area is applied, which is thus appropriate.

An electronic device 300 according to an embodiment may include a first camera module, and a flash module 340 disposed adjacent to the first camera module, wherein the flash module 340 may include an LED 740 configured to emit light, and an optical lens 710 disposed in the traveling direction of the light emitted from the LED 740, wherein the optical lens 710 may include a first surface in the direction facing the LED and a second surface in the direction opposite the first surface, and wherein the second surface of the optical lens 710 may include a first translucent area 711 including a central area where the light emitted from the LED 740 is incident and a second translucent area 712 spaced apart from the first translucent area.

According to an embodiment, the second surface of the optical lens may further include a transparent area formed between the first translucent area and the second translucent area.

According to an embodiment, the first translucent area may be located at the central portion of the second surface, and the second translucent area may be located in the peripheral portion of the second surface.

According to an embodiment, the transmittance of the first translucent area and the transmittance of the second translucent area may be the same.

According to an embodiment, the transmittance of the transparent area may be higher than the transmittance of the first translucent area and the transmittance of the second translucent area.

According to an embodiment, the first surface of the optical lens may include a diffusion pattern area configured to diffuse the light emitted from the LED.

According to an embodiment, the second surface may be configured in a circular shape overlapping at least a central portion of the LED when viewed from the front of the electronic device.

According to an embodiment, the size and position of the first translucent area may correspond to the size and position of the LED.

According to an embodiment, the size and position of the second translucent area may be determined according to a variable K indicating a positional relationship between the first camera module and the LED.

According to an embodiment, the electronic device may further include a first point and a second point, wherein the first point and the second point may be positioned on the second surface, wherein the first point may be a point on the second surface closest to the center of the first camera module when viewed from the front of the electronic device, and wherein the second point may be a point on the second surface farthest from the center of the first camera module when viewed from the front of the electronic device.

According to an embodiment, the second translucent area may include a bow-shaped area formed between the first point and a third point, and a bow-shaped area formed between the second point and a fourth point, wherein the third point may be formed at a position spaced apart from the first point by a variable K in the direction of the center of the second surface, and wherein the fourth point may be formed at a position spaced apart from the second point by a variable K in the direction of the center of the second surface.

According to an embodiment, the size of the second translucent area may be determined according to the variable K, and the variable K may satisfy the following conditions (1), (2), (3) and (4), $$X=h/\tan(90-a/2)° \tag{1}$$

(h: the distance between the center of the first camera module and a subject, a: the field of view (fov) of the first camera module)

$$Y=h/\tan(90-b/2)° \tag{2}$$

(h: the distance between the center of the first camera module and a subject, b: the field of view (fov) of the LED)

$$Z=X-Y+c \tag{3}$$

(c: the distance between the first camera module and the LED)

$$K=(Z*d)/2Y \tag{4}$$

(d: the diameter of the LED).

According to an embodiment, the emission area of the LED may overlap the field of view (fov) of the first camera module.

According to an embodiment, the electronic device may further include a second camera module.

According to an embodiment, the size and position of the second translucent area may be determined according to a variable K1 indicating a positional relationship between the first camera module and the LED, and a variable K2 indicating a positional relationship between the second camera module and the LED.

According to an embodiment, the variable K1 may satisfy the following conditions (1), (2), (3), and (4), and the variable K2 may satisfy the following conditions (5), (6), (7), and (8), $$X1=h1/\tan(90-a1/2)° \tag{1}$$

(h1: the distance between the center of the first camera module and a subject, a1: the field of view (fov) of the first camera module)

$$Y1=h1/\tan(90-b1/2)° \tag{2}$$

(h1: the distance between the center of the first camera module and a subject, b1: the field of view (fov) of the LED)

$$Z1=X1-Y1+c1 \tag{3}$$

(c1: the distance between the first camera module and the LED)

$$K1=(Z1*d1)/2Y1 \tag{4}$$

(d1: the diameter of the LED)

$$X2=h2/\tan(90-a2/2)° \tag{5}$$

(h2: the distance between the center of the second camera module and a subject, a2: the field of view (fov) of the second camera module)

$$Y2=h2/\tan(90-b1/2)° \tag{6}$$

(h2: the distance between the center of the second camera module and a subject, b1: the field of view (fov) of the LED)

$$Z2=X2-Y2+c2 \tag{7}$$

(c2: the distance between the second camera module and the LED)

$$K2=(Z2*d1)/2Y2 \tag{8}$$

(d1: the diameter of the LED)

According to an embodiment, the second surface may include a first point, a second point, a third point, and a fourth point, wherein the first point may be a point on the second surface closest to the center of the first camera module when viewed from the front of the electronic device, wherein the second point may be a point on the second surface farthest from the center of the first camera module when viewed from the front of the electronic device, wherein the third point may be a point on the second surface closest to the center of the second camera module when viewed from the front of the electronic device, and wherein the fourth point may be a point on the second surface farthest from the center of the second camera module when viewed from the front of the electronic device.

According to an embodiment, the second translucent area may include a first intermediary translucent area and a second intermediary translucent area, wherein the first intermediary translucent area includes a bow-shaped area formed between the first point and a fifth point, and a bow-shaped area formed between the second point and a sixth point, wherein the fifth point is formed at a position spaced apart from the first point by the variable K1 in a direction of a center of the second surface, and wherein the sixth point is formed at a position spaced apart from the second point by the variable K1 in the direction of the center of the second surface, wherein the second intermediary translucent area includes a bow-shaped area formed between the third point and a seventh point, and a bow-shaped area formed between the fourth point and a eighth point, wherein the seventh point is formed at a position spaced apart from the third point by the variable K2 in the direction of the center of the second surface, and wherein the eighth point is formed at a position spaced apart from the fourth point by the variable K2 in the direction of the center of the second surface, and wherein the second translucent area is only portions of the first intermediary translucent area and the second intermediary translucent area that overlap each other.

According to an embodiment, the first translucent area and the second translucent area may be implemented using at least one of methods of sand-blasting, acid-etching, and attaching a translucent film.

While the present disclosure has been shown and described with reference to various embodiments thereof, it will be understood by those skilled in the art that various changes in form and details may be made therein without departing from the present disclosure as defined by the appended claims and their equivalents.

The invention claimed is:
1. An electronic device comprising:
a first camera module; and
a flash module disposed adjacent to the first camera module,
wherein the flash module comprises:
an LED configured to emit light; and
an optical lens disposed in a traveling direction of the light emitted from the LED, wherein the optical lens includes a first surface in a first direction facing the LED and a second surface in a second direction opposite the first surface, wherein the second surface of the optical lens includes a first translucent area including a central area where the light emitted from the LED is incident and a second translucent area spaced apart from the first translucent area, and wherein the first translucent area has a transparency of at least 25%.

2. The electronic device of claim 1, wherein the first translucent area is located at a central portion of the second surface, and wherein the second translucent area is located in a peripheral portion of the second surface.

3. The electronic device of claim 1, wherein the first surface of the optical lens further comprises a diffusion pattern area configured to diffuse the light emitted from the LED.

4. The electronic device of claim 1, further comprising a transparent area between the first surface and the second surface.

5. The electronic device of claim 1, wherein transmittance of the first translucent area and transmittance of the second translucent area are the same.

6. The electronic device of claim 1, wherein a size and a position of the first translucent area correspond to a size and a position of the LED.

7. The electronic device of claim 1, wherein a size and a position of the second translucent area are determined based on a variable K indicating a positional relationship between the first camera module and the LED.

8. The electronic device of claim 7, further comprising a first point and a second point, wherein the first point and the second point are positioned on the second surface, wherein the first point is a point on the second surface closest to a center of the first camera module when viewed from a front of the electronic device, and wherein the second point is a point on the second surface farthest from the center of the first camera module when viewed from the front of the electronic device.

9. The electronic device of claim 8, wherein the second translucent area comprises a bow-shaped area formed between the first point and a third point, and a bow-shaped area formed between the second point and a fourth point, wherein the third point is formed at a position spaced apart from the first point by the variable K in a direction of a center of the second surface, and wherein the fourth point is formed at a position spaced apart from the second point by the variable K in the direction of the center of the second surface.

10. The electronic device of claim 8, wherein the size of the second translucent area is determined according to the variable K, and wherein the variable K satisfies the following conditions (1), (2), (3) and (4), $$X = h/\tan(90-a/2)° \tag{1}$$

wherein h is a distance between the center of the first camera module and a subject, and a is a field of view (fov) of the first camera module, $$Y = h/\tan(90-b/2)° \tag{2}$$

wherein b is a field of view (fov) of the LED, $$Z = X - Y + c \tag{3}$$

wherein c is a distance between the first camera module and the LED, and $$K = (Z*d)/2Y \tag{4}$$

wherein d is a diameter of the LED.

11. The electronic device of claim 1, wherein an emission area of the LED overlaps a field of view (fov) of the first camera module.

12. The electronic device of claim 1, further comprising a second camera module.

13. The electronic device of claim 12, wherein a size and a position of the second translucent area are determined according to a variable K1 indicating a positional relationship between the first camera module and the LED, and a variable K2 indicating a positional relationship between the second camera module and the LED.

14. The electronic device of claim 13, wherein the variable K1 satisfies the following conditions (1), (2), (3), and (4), and the variable K2 satisfies the following conditions (5), (6), (7), and (8), $$X1 = h1/\tan(90-a1/2)° \tag{1}$$

wherein h1 is a distance between a center of the first camera module and a subject, and a1 is a field of view (fov) of the first camera module, $$Y1 = h1/\tan(90-b1/2)° \tag{2}$$

wherein b1 is a field of view (fov) of the LED, $$Z1 = X1 - Y1 + c1 \tag{3}$$

wherein c1 is a distance between the first camera module and the LED, $$K1 = (Z1*d1)/2Y1 \tag{4}$$

wherein d1 is a diameter of the LED, $$X2 = h2/\tan(90-a2/2)° \tag{5}$$

wherein h2 is a distance between the center of the second camera module and the subject, and a2 is a field of view (fov) of the second camera module, $$Y2 = h2/\tan(90-b1/2)°, \tag{6}$$

$$Z2 = X2 - Y2 + c2 \tag{7}$$

wherein c2 is a distance between the second camera module and the LED, and $$K2 = (Z2*d1)/2Y2. \tag{8}$$

15. The electronic device of claim 14, wherein the second surface comprises a first point, a second point, a third point, and a fourth point, wherein the first point is a point on the second surface closest to the center of the first camera module when viewed from a front of the electronic device, wherein the second point is a point on the second surface farthest from the center of the first camera module when viewed from the front of the electronic device, wherein the third point is a point on the second surface closest to the center of the second camera module when viewed from the front of the electronic device, and wherein the fourth point is a point on the second surface farthest from the center of the second camera module when viewed from the front of the electronic device.

16. The electronic device of claim 15, wherein the second translucent area comprises a first intermediary translucent area and a second intermediary translucent area, wherein the first intermediary translucent area includes a bow-shaped area formed between the first point and a fifth point, and a bow-shaped area formed between the second point and a sixth point, wherein the fifth point is formed at a position spaced apart from the first point by the variable K1 in a direction of a center of the second surface, and wherein the sixth point is formed at a position spaced apart from the second point by the variable K1 in the direction of the center of the second surface, wherein the second intermediary translucent area includes a bow-shaped area formed between the third point and a seventh point, and a bow-shaped area formed between the fourth point and a eighth point, wherein the seventh point is formed at a position spaced apart from the third point by the variable K2 in the direction of the center of the second surface, and wherein the eighth point is formed at a position spaced apart from the fourth point by the variable K2 in the direction of the center of the second surface, and wherein the second translucent area is only portions of the first intermediary translucent area and the second intermediary translucent area that overlap each other.

17. The electronic device of claim 1, wherein the first translucent area and the second translucent area are implemented using methods of sand-blasting, acid-etching, and/or attaching a translucent film.

18. An electronic device comprising,
a first camera module; and
a flash module disposed adjacent to the first camera module,
wherein the flash module comprises:
an LED configured to emit light; and
an optical lens disposed in a traveling direction of the light emitted from the LED,
wherein the optical lens includes a first direction facing the LED and a second surface in a second direction opposite of the first surface,
wherein the second surface of the optical lens includes a first translucent area including a central area where the light emitted from the LED is incident and a second translucent area and a transparent area formed between the first translucent area and the second translucent area.

19. The electronic device of claim 18, wherein transmittance of the transparent area is higher than transmittance of the first translucent area and transmittance of the second translucent area.

20. The electronic device of claim 18, wherein the second surface is configured in a circular shape overlapping at least a central portion of the LED when viewed from a front of the electronic device.

* * * * *